(12) United States Patent
Hirakawa

(10) Patent No.: US 11,049,376 B2
(45) Date of Patent: Jun. 29, 2021

(54) SETTING ASSISTANCE DEVICE, SETTING ASSISTANCE METHOD, AND PROGRAM RECORDING MEDIUM

(71) Applicant: NEC CORPORATION, Tokyo (JP)

(72) Inventor: Yasufumi Hirakawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/778,334

(22) PCT Filed: Dec. 16, 2016

(86) PCT No.: PCT/JP2016/087649
§ 371 (c)(1),
(2) Date: May 23, 2018

(87) PCT Pub. No.: WO2017/104835
PCT Pub. Date: Jun. 22, 2017

(65) Prior Publication Data
US 2018/0350212 A1    Dec. 6, 2018

(30) Foreign Application Priority Data

Dec. 16, 2015 (JP) .............................. JP2015-245497

(51) Int. Cl.
*G08B 13/196* (2006.01)
*H04N 13/275* (2018.01)
*H04N 7/18* (2006.01)

(52) U.S. Cl.
CPC ....... *G08B 13/1968* (2013.01); *G08B 13/196* (2013.01); *G08B 13/19608* (2013.01);
(Continued)

(58) Field of Classification Search
CPC ............ G08B 13/196; G08B 13/19608; G08B 13/19652; G08B 13/1968; H04N 13/275; H04N 7/18; H04N 7/183
(Continued)

(56) References Cited

U.S. PATENT DOCUMENTS 6,185,314 B1    2/2001 Crabtree et al.
6,445,409 B1    9/2002 Ito et al.
(Continued)

FOREIGN PATENT DOCUMENTS

CN    101068342 A    11/2007
CN    101068344 A    11/2007
(Continued)

OTHER PUBLICATIONS

International Search Report for PCT/JP2016/087649 dated, Feb. 28, 2017 (PCT/ISA/210).
(Continued)

*Primary Examiner* — Mulugeta Mengesha
*Assistant Examiner* — Alazar Tilahun
(74) *Attorney, Agent, or Firm* — Sughrue Mion, PLLC

(57) ABSTRACT

A setting assistance device includes an acquisition unit, a calculation unit and a determination unit. The acquisition unit acquires coordinates designated by a user for an image capturing a three-dimensional space. The calculation unit calculates coordinates of a position located at a predetermined distance from a position of a part of the three-dimensional space relating to the acquired coordinates. The determination unit determines a region set for the acquired coordinates based on the calculated coordinates.

10 Claims, 16 Drawing Sheets

(52) U.S. Cl.
CPC ......... *G08B 13/19652* (2013.01); *H04N 7/18* (2013.01); *H04N 7/183* (2013.01); *H04N 13/275* (2018.05)

(58) Field of Classification Search
USPC .......................... 382/103; 348/155; 345/156
See application file for complete search history.

(56) References Cited

U.S. PATENT DOCUMENTS

| | | | |
|---|---|---|---|
| 2001/0012379 A1 | 8/2001 | Amemiya et al. | |
| 2008/0018738 A1 | 1/2008 | Lipton et al. | |
| 2009/0244291 A1 | 10/2009 | Saptharishi et al. | |
| 2013/0307981 A1 | 11/2013 | Jang et al. | |
| 2014/0161312 A1* | 6/2014 | Adachi | G06K 9/00362 382/103 |
| 2014/0267751 A1 | 9/2014 | Kitagawa | |
| 2015/0077331 A1* | 3/2015 | Kasahara | G06T 19/006 345/156 |
| 2015/0234471 A1* | 8/2015 | Niinuma | G06F 3/011 345/156 |
| 2015/0249807 A1 | 9/2015 | Naylor et al. | |
| 2015/0334356 A1 | 11/2015 | Kim et al. | |
| 2015/0348383 A1* | 12/2015 | Naylor | G08B 13/19613 348/155 |
| 2016/0042243 A1 | 2/2016 | Miyano | |
| 2016/0098603 A1 | 4/2016 | Kim et al. | |
| 2016/0253579 A1* | 9/2016 | Bamba | G06K 9/2081 382/103 |
| 2018/0173965 A1* | 6/2018 | Pan | G08B 13/19608 |

FOREIGN PATENT DOCUMENTS

| | | | |
|---|---|---|---|
| CN | 101635835 A | 1/2010 | |
| CN | 103414870 A | 11/2013 | |
| CN | 103871046 A | 6/2014 | |
| CN | 104349136 A | 2/2015 | |
| CN | 105828045 A | 8/2016 | |
| CN | 106060452 A | 10/2016 | |
| EP | 1873732 A2 | 1/2008 | |
| JP | 2007-011776 A | 1/2007 | |
| JP | 2008181347 A | 8/2008 | |
| JP | 2008-225803 A | 9/2008 | |
| JP | 2010-102511 A | 5/2010 | |
| JP | 2010-146290 A | 7/2010 | |
| JP | 4754283 B2 | 8/2011 | |
| JP | 2012-058880 A | 3/2012 | |
| JP | 6013319 B2 | 8/2012 | |
| JP | 2013-065351 A | 4/2013 | |
| JP | 2014063290 A | 4/2014 | |
| JP | 2014179923 A | 9/2014 | |
| KR | 10-2015-0132693 A | 11/2015 | |
| WO | 2009126151 A1 | 10/2009 | |
| WO | 2017/104835 A1 | 11/2018 | |

OTHER PUBLICATIONS

Written Opinion of the International Searching Authority for PCT/JP2016/087649 dated, Feb. 28, 2017 (PCT/ISA/237).
Communication dated Apr. 15, 2019, from the Canadian Intellectual Property Office in counterpart application No. 3,008,594.
Communication dated Jan. 28, 2020, from the Japanese Patent Office in application No. 2017-556481.
Communication dated Mar. 19, 2020 from the United States Patent and Trademark Office in U.S. Appl. No. 16/292,885.
Notice of Allowance dated Jul. 17, 2020, From the United States Patent and Trademark Office in U.S. Appl. No. 16/292,885.
Communication dated Jun. 23, 2020, from the State Intellectual Property Office of the P.R. of China in application No. 201680074334.0.
Wang Sining, "Geo-fencing based on Video and its Application", Nanjing Normal University, a Dissertation Submitted in Partial Fulfillment of the Requirements for the Degree of Master of Science, May 2015, pp. 1-71 (83 pages total).
Communication dated Jul. 11, 2019 from the State Intellectual Property Office of the P.R.C in application No. 201680074334.0.
Communication dated Jul. 23, 2019 from the European Patent Office in application No. 16875809.2.
Communication dated Jul. 30, 2019 from the Japanese Patent Office in application No. 2017-556481.
Office Action dated Aug. 29, 2019 issued in U.S. Appl. No. 16/292,885.
Chinese Office Action for CN Application No. 201680074334.0 dated Jan. 15, 2021 with English Translation.
Japanese Office Action for JP Application No. 2020-087798 dated Mar. 30, 2021 with English Translation.

* cited by examiner

SETTING ASSISTANCE DEVICE, SETTING ASSISTANCE METHOD, AND PROGRAM RECORDING MEDIUM

CROSS REFERENCE TO RELATED APPLICATIONS

This application is a National Stage of International Application No. PCT/JP2016/087649 filed Dec. 16, 2016, claiming priority based on Japanese Patent Application No. 2015-245497, filed Dec. 16, 2015, the disclosure of which is incorporated herein in its entirety by reference.

TECHNICAL FIELD

The present invention relates to an image surveillance technique and in particular to an intrusion detection technique.

BACKGROUND ART

In order to realize a safe and secure society, surveillance cameras have been actively installed in cities and buildings. While places to be monitored increase in this manner, manual surveillance is limited, and therefore a method for efficiently confirming an image captured by a surveillance camera has been demanded. One method for realizing efficient surveillance is an image surveillance technique for detecting/recognizing an object appearing on a surveillance camera, and outputting an alert when the object is a monitoring target. Patent Literature (PTL) 1 to PTL 3 describe an example of such a technique.

The image surveillance technique includes, for example, a warning line technique for detecting an object that has passed a line on an image, and a warning region technique for detecting an object that has intruded into a specific region on an image. FIG. 5 represents an example of the warning line technique. In this example, an object that passes a line segment connecting a wall and a wall on an image is detected, and a warning is output when the object is a monitoring target. The line segment may be referred to as a warning line. FIG. 6 represents an example of the warning region technique. In this example, an object that intrudes into a specific region on an image is detected, and a warning is output when the object is a monitoring target. The specific region may be referred to as a warning region.

Even when it is detected by the warning line technique or the warning region technique that a monitoring target pass, a response to the monitoring target may be delayed. Thus, in order to early detect the monitoring target, an auxiliary warning region is frequently set together. The auxiliary warning region is used to detect the monitoring target approaching a warning line or a warning region before detecting that the monitoring target pass. The auxiliary warning region is set in a wide range including the warning line or the warning region. A warning is output when, after an object that has intruded into the auxiliary warning region is detected as a monitoring target, the monitoring target stays in the auxiliary warning region for a predetermined time period or longer. The predetermined time period may be referred to as an intrusion duration time. The auxiliary warning region is limited within an image-capturing region. Therefore, the auxiliary warning region frequently has a complex shape in conformity to the image-capturing range or a shape of a field site.

CITATION LIST

Patent Literature

[PTL 1] Japanese Laid-open Patent Publication No. 2008-225803
[PTL 2] Japanese Laid-open Patent Publication No. 2012-058880
[PTL 3] Japanese Laid-open Patent Publication No. 2010-102511

SUMMARY OF INVENTION

Technical Problem

In the above-described image surveillance technique, it has been possible to set only one intrusion duration time for the auxiliary warning region. Further, the intrusion duration time does not depend on an intrusion position of an object. Therefore, the set intrusion duration time has been sometimes excessively long for the intrusion position of the object into the auxiliary warning region. In other words, before a warning is output due to a fact that time elapsed from detection of intrusion into the auxiliary warning region is equal to or longer than the intrusion duration time, the object has intruded into the warning region in some cases. FIG. 7 represents an example of the auxiliary warning region. In this example, an object that intrudes into a specific region on an image is detected, and a warning is output when the object is a monitoring target. The specific region may be referred to as the auxiliary warning region. In FIG. 7, routes i and ii connecting the warning line and the auxiliary warning region are different in real distance. When, for example, assuming the route ii, the intrusion duration time is set for the auxiliary warning region, an object that has intruded via the route i having a shorter real distance than a real distance of the route ii may intrude into the warning region before the set intrusion duration time elapses.

An object of the present invention is to provide an intrusion detection device capable of performing image surveillance depending on an intrusion position where an object intrudes into a specific region on an image, a setting assistance device, an intrusion detection method, a setting assistance method, and a program recording medium.

Solution to Problem

An intrusion detection device of the present invention includes:
a detection unit that detects—an intrusion position on an image, the intrusion position being where an object intrudes into a specific region on the image; and
a control unit that associates the intrusion position on the image with a predetermined time period,
wherein the detection unit outputs an alert when the object stays in the specific region on the image for the predetermined time period or longer, the predetermined time period is associated with the detected intrusion position.

An intrusion detection method of the present invention includes:
detecting an intrusion position on an image, the intrusion position being where an object intrudes into a specific region on the image;
associating the intrusion position with a predetermined time period; and outputting an alert when the object stays in the specific region on the image for the predetermined time period or longer, the predetermined time period is associated with the detected intrusion position.

In a computer-readable program recording medium of the present invention, a program recorded in the computer-readable program recording medium of the present invention causes a computer to function as:

a detection unit that detects an intrusion position on an image, the intrusion position being where an object intrudes into a specific region on the image; and a control unit that associates the intrusion position on the image with a predetermined time period, wherein the detection unit outputs an alert when the object stays in the specific region on the image for the predetermined time period or longer, the predetermined time period is associated with the detected intrusion position.

A setting assistance device of the present invention includes:

an acquisition unit that acquires coordinates designated by a user for an image capturing a three-dimensional space;

a calculation unit that calculates coordinates of a position located at a predetermined distance from a position of a part of the three-dimensional space relating to the acquired coordinates; and a determination unit that determines a region set for the acquired coordinates based on the calculated coordinates.

A setting assistance method of the present invention includes:

acquiring coordinates designated by a user for an image capturing a three-dimensional space;

calculating coordinates of a position located at a predetermined distance from a position of a part of the three-dimensional space relating to the acquired coordinates; and determining a region set for the acquired coordinates based on the calculated coordinates.

In a computer-readable program recording medium of the present invention, a program recorded in the computer-readable program recording medium causes a computer to execute:

acquiring coordinates designated by a user for an image capturing a three-dimensional space;

calculating coordinates of a position located at a predetermined distance from a position of a part of the three-dimensional space relating to the acquired coordinates; and determining a region set for the acquired coordinates based on the calculated coordinates.

Advantageous Effects of Invention

According to the intrusion detection device, the setting assistance device, the intrusion detection method, the setting assistance method, and the program recording medium of the present invention, image surveillance can be performed depending on an intrusion position where an object intrudes into a specific region on an image.

DESCRIPTION OF EMBODIMENTS

With reference to the drawings, example embodiments of the present invention will be described in detail below. Note that, in the following description, a component including the same function is assigned with the same reference sign, and description thereof may be omitted.

First Example Embodiment (Configuration)

Figure 1:
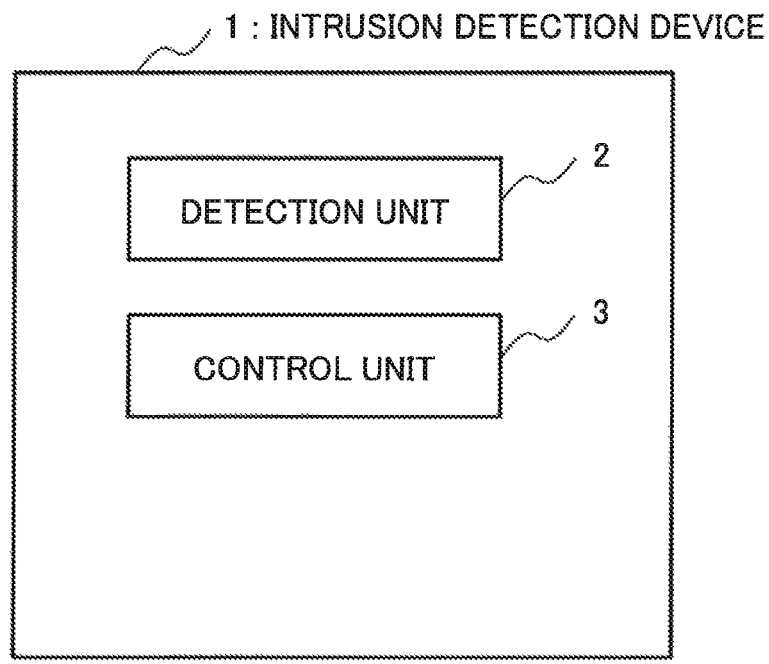
FIG. 1 is a block diagram illustrating one example of unit to set an auxiliary warning region according to a first example embodiment of the present invention.

FIG. 1 is a block diagram illustrating one example of unit to set an auxiliary warning region according to a first example embodiment of the present invention. In the present example embodiment, an intrusion detection device 1 includes detection unit 2 and control unit 3.

(Operation)

The detection unit 2 detects an intrusion position in a specific region (auxiliary warning region) on an image by an object having intruded into the specific region (auxiliary warning region). The control unit 3 associates the intrusion position on the image with a predetermined time period (intrusion duration time). Further, the detection unit 2 outputs an alert to an operator when the object has stayed in the specific region (auxiliary warning region) on the image for the predetermined time period (intrusion duration time) or longer associated with the intrusion position detected by the detection unit 2. The predetermined time period referred to here is a time period determined for each position on an image and is defined, for example, by an operator.

For more detail, the detection unit 2 detects an object having intruded into the auxiliary warning region and identifies, if the object is a monitoring target, the intrusion position of the monitoring target into the auxiliary warning region. Further, the detection unit 2 outputs an alert to an operator when the monitoring target has stayed in the auxiliary warning region for the predetermined time period (intrusion duration time) or longer associated with the identified intrusion position. The control unit 3 associates the position on an image with the predetermined time period (intrusion duration time) and transmits sets of the associated position and the predetermined time period (intrusion duration time) to the detection unit 2. The detection unit 2 outputs an alert to an operator based on the intrusion duration time of a set in which the intrusion position identified by the detection unit 2 and the position associated by the control unit 3 are matched among the received sets. Alternatively, the detection unit 2 may output the alert to an object having intruded into the auxiliary warning region. The control unit 3 may perform association, for example, at every fixed time. Alternatively, the control unit 3 may perform association when the detection unit 2 makes a request. Further, the control unit 3 may store a set of the position and the predetermined time period (intrusion duration time) associated with each other.

(Advantageous Effect)

According to the present example embodiment, image surveillance according to the intrusion position of the object into the specific region on an image can be performed.

Second Example Embodiment (Configuration)

Figure 2:
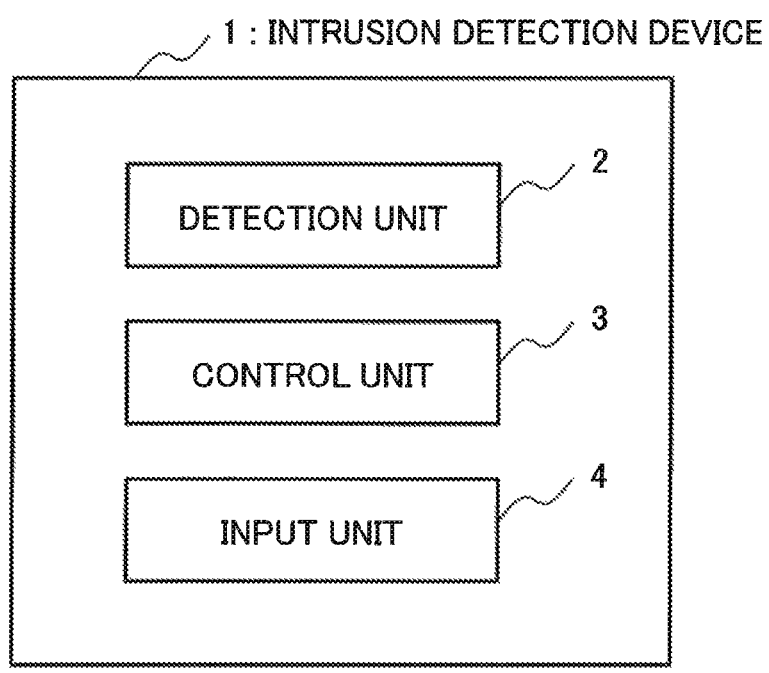
FIG. 2 is a block diagram illustrating one example of unit to set an auxiliary warning region according to a second example embodiment of the present invention.

FIG. 2 is a block diagram illustrating one example of unit to set the auxiliary warning region according to a second example embodiment of the present invention. The intrusion detection device 1 further includes input unit 4 to accept the intrusion position into the auxiliary warning region and the predetermined time period, in addition to the detection unit 2 and the control unit 3.

The input unit 4 is a unit to accept the intrusion position into the auxiliary warning region and the predetermined time period. The intrusion position represents, for example, coordinates on an image. The intrusion position is input by being executed in such a way that the input unit 4 displays an image on a display, accepts writing of a dot or line on the displayed image, and calculates coordinates on the image from the written dot or line. The predetermined time period is input, for example, with a numerical value. The numerical value may be input by a numerical keypad or another input method. A unit of the predetermined time period may be seconds or minutes.

The control unit 3 is unit to associate the intrusion position with the predetermined time period based on the accepted intrusion position and the accepted predetermined time period. A central processing unit (CPU) executes, for example, a predetermined program and thereby the control unit 3 may be realized. When, for example, the input unit 4 accepts the intrusion position and the predetermined time period as one set, the control unit 3 may associate the intrusion position and the predetermined time period accepted as one set. Alternatively, when accepting the predetermined time period, the input unit 4 causes an operator to select the intrusion position that is a target to be associated with the predetermined time. Then, the control unit 3 may associate the selected intrusion position with the accepted predetermined time period. Alternatively, the control unit 3 may associate the intrusion position with the predetermined time period based on input order of the intrusion positions and the predetermined time periods. The control unit 3 associates, for example, first input of the intrusion position with first input of the predetermined time period and further associates second input of the intrusion position with second input of the predetermined time period.

The control unit 3 transmits a set of the associated intrusion position and predetermined time period to the detection unit 2. When making a plurality of sets of the associated intrusion position and predetermined time period, the control unit 3 may transmit each of the plurality of sets to the detection unit 2.

The detection unit 2 is unit to identify the intrusion position of a monitoring target into the auxiliary warning region. And the detection unit 2 is unit to refer to the predetermined time period associated the identified intrusion position as the intrusion duration time and output the alert to an operator when the monitoring target has stayed in the auxiliary warning region for the intrusion duration time or longer. One or more sets of the intrusion position and the predetermined time period associated with each other in the control unit 3 is transmitted to the detection unit 2 from the control unit 3. The detection unit 2 may store the transmitted one or more sets on a storage that is not illustrated. The detection unit 2 can identify the intrusion position of a monitoring target into the auxiliary warning region. The detection unit 2 may identify a position where a monitoring target crosses a border line of the auxiliary warning region as the intrusion position, for example, using the warning line technique. The detection unit 2 retrieves the identified intrusion position from the one or more sets transmitted from the control unit 3. Then, the detection unit 2 refers to the predetermined time period associated with the retrieved intrusion position as the intrusion duration time. The detection unit 2 compares a time period in which the monitoring target has stayed in the auxiliary warning region with the intrusion duration time and outputs the alert to an operator when the monitoring target has stayed for the intrusion duration time or longer.

(Operation)

Next, one example of an operation of the intrusion detection device 1 according to the second example embodiment of the present invention will be described.

The input unit 4 accepts the intrusion position into the auxiliary warning region and the predetermined time period. The input unit 4 transmits the accepted intrusion position and the accepted predetermined time period to the control unit 3.

Then, the control unit 3 associates the intrusion position and the predetermined time period based on the accepted intrusion position and the accepted predetermined time period. An association method is a method as described above. The control unit 3 associates the intrusion position and the predetermined time period and transmits a set of the associated intrusion position and predetermined time period to the detection unit 2.

The detection unit 2 identifies the intrusion position of a monitoring target into the auxiliary warning region, asynchronously with transmission of the intrusion position and the predetermined time period by the control unit 3. This identification may be performed every time a predetermined time period elapses such as every thirty seconds or every minute.

The detection unit 2 retrieves the identified intrusion position from one or more sets transmitted from the control unit 3 when detecting intrusion of a monitoring target into the auxiliary warning region or identifying the intrusion position. Then, the detection unit 2 refers to the predetermined time period associated with the retrieved intrusion position as the intrusion duration time. The detection unit 2 compares a time period in which the monitoring target has stayed in the auxiliary warning region with the intrusion duration time and outputs the alert to an operator when the monitoring target has stayed for the intrusion duration time or longer.

Note that, in the description of the operation, it is explained that identification of the intrusion position by the detection unit 2 and transmission from the control unit 3 to the detection unit 2 are asynchronously performed, but an order of both is not limited to that. When, for example, the intrusion position and the predetermined time period have been transmitted from the control unit 3 to the detection unit 2, the detection unit 2 may operate in such a way as to start identifying the intrusion position. Further, when having been able to identify the intrusion position, the detection unit 2 may operate in such a way as to cause the control unit 3 to transmit the intrusion position and the predetermined time period.

(Advantageous Effect)

According to the present example embodiment, image surveillance according to the intrusion position of an object into the specific region on the image can be performed.

Third Example Embodiment (Configuration)

Figure 3:
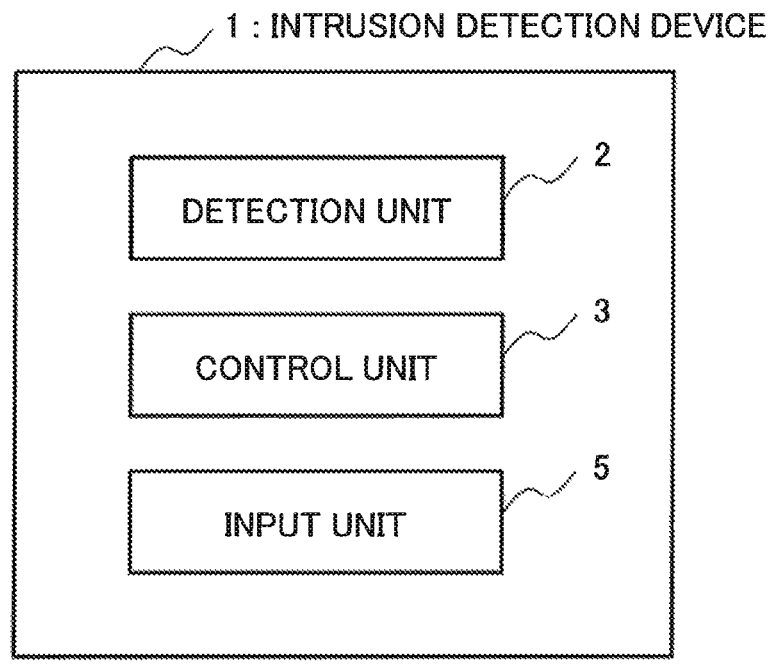
FIG. 3 is a block diagram illustrating one example of unit to set an auxiliary warning region according to a third example embodiment of the present invention.

FIG. 3 is a block diagram illustrating one example of unit to set the auxiliary warning region according to a third example embodiment of the present invention. The intrusion detection device 1 further includes an input unit 5 to accept the intrusion position into the auxiliary warning region, in addition to the detection unit 2 and the control unit 3.

(Operation)

The input unit 5 accepts the intrusion position into the auxiliary warning region. The input unit 5 further transmits the accepted intrusion position to the control unit 3. The control unit 3 sets a predetermined time period based on the intrusion position.

The setting of the predetermined time period by the control unit 3 can be executed, for example, by the following method. The control unit 3 acquires, for example, a warning line and calculates a shortest distance between the acquired warning line and the input intrusion position. Next, the control unit 3 acquires a moving velocity of an object. Thereafter, the predetermined time period is calculated from the moving velocity of the object acquired by the control unit 3 and the calculated shortest distance.

The acquisition of the moving velocity of the object by the control unit 3 can be executed, for example, by the following method. For example, the control unit 3 accepts a numerical value representing the moving velocity of the object. Alternatively, the control unit 3 calculates the moving velocity of the object from an image.

The calculation of the predetermined time period by the control unit 3 can be executed, for example, by the following method. The control unit 3 determines, for example, a value obtained by dividing the shortest distance calculated by the above-described method by the moving velocity calculated by the above-described method. Further, the predetermined time period may be a value obtained by adding a predetermined value to the determined value by the control unit 3. Thereby, setting considering an operation in actual surveillance can be executed.

(Advantageous Effect)

According to the present example embodiment, image surveillance according to the intrusion position of an object into the specific region on an image can be performed.

Fourth Example Embodiment (Configuration)

Figure 4:
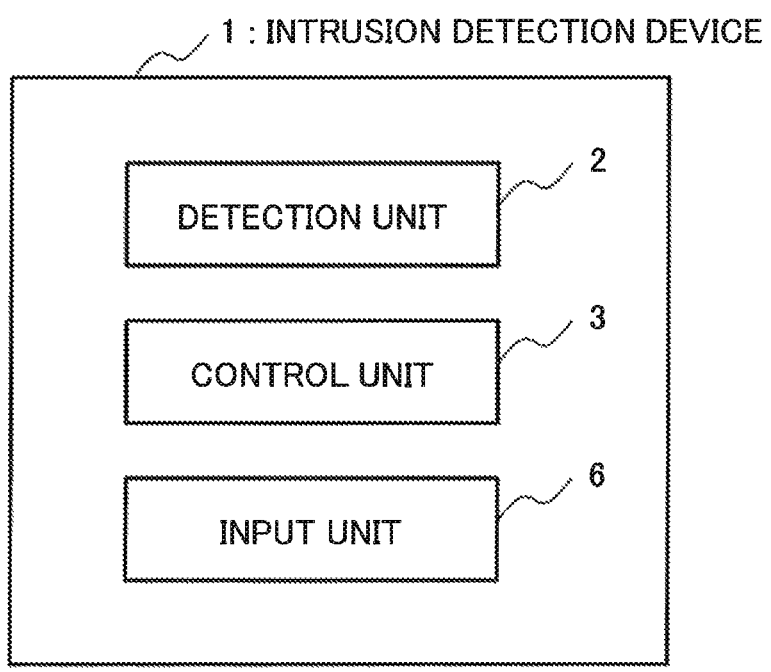
FIG. 4 is a block diagram illustrating one example of unit to set an auxiliary warning region according to a fourth example embodiment of the present invention.
Figure 5:
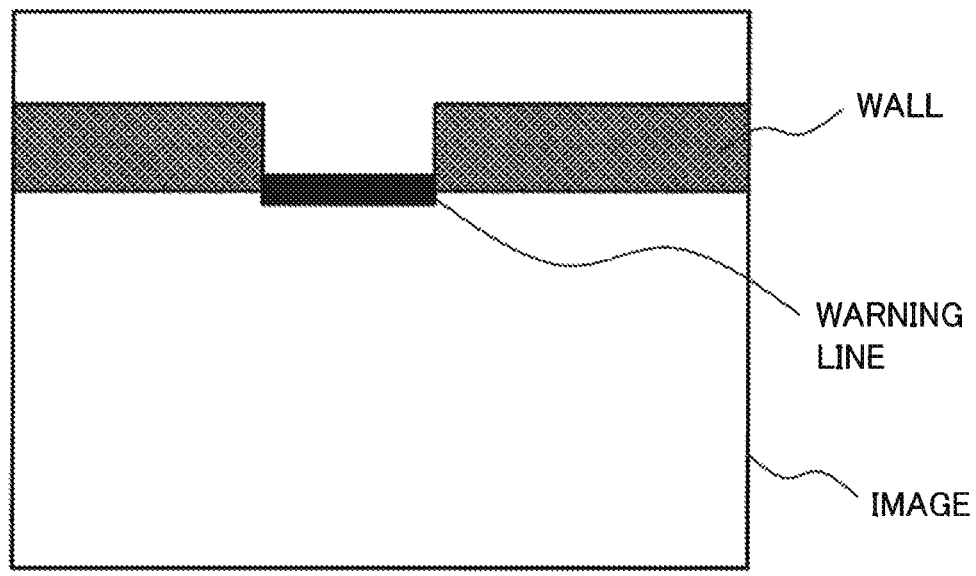
FIG. 5 represents an example of a warning line technique.
Figure 6:
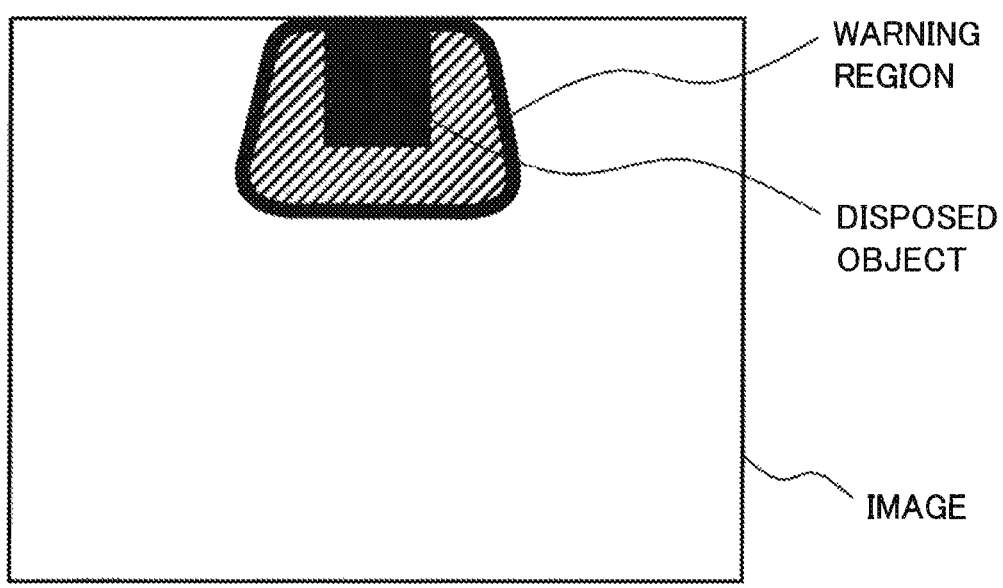
FIG. 6 represents an example of a warning region technique.
Figure 7:
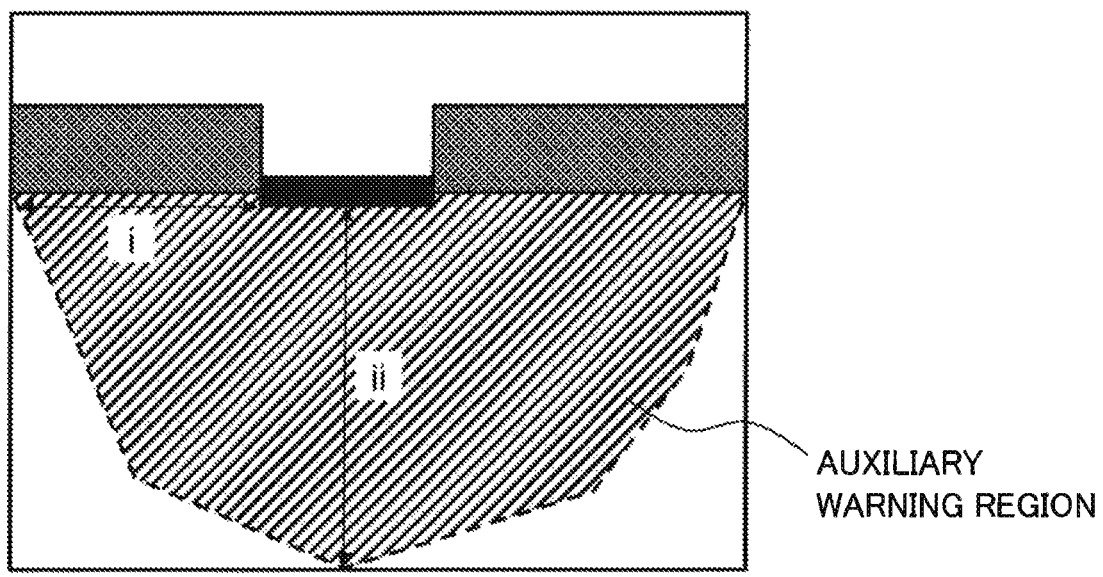
FIG. 7 represents an example of an auxiliary warning region.

FIG. 4 is a block diagram illustrating one example of unit to set the auxiliary warning region according to a fourth example embodiment of the present invention. The intrusion detection device 1 further includes an input unit 6 to accept the predetermined time period, in addition to the detection unit 2 and the control unit 3.

(Operation)

The input unit 6 accepts the predetermined time period. The input unit 6 further transmits the accepted predetermined time period to the control unit 3. The control unit 3 sets the specific region (auxiliary warning region) based on the accepted predetermined time period. The setting of the auxiliary warning region by the control unit 3 can be executed, for example, by the following method. The control unit 3 acquires, for example, the moving velocity of the object and calculates the moving distance of the object in the predetermined time period based on the acquired moving velocity of the object and the predetermined time period. Further, the control unit 3 accepts, for example, the warning line, calculates coordinates at the moving distance of the object calculated from the accepted warning line as the intrusion position of the object, and sets the calculated intrusion position of the object. There may be a plurality of intrusion positions of the object at that time. A set of the plurality of intrusion positions of the object forms a line segment. This line segment is the auxiliary warning line. A region surrounded by the auxiliary warning line is the auxiliary warning region.

(Advantageous Effect)

According to the present example embodiment, image surveillance according to the intrusion position of the object into the specific region on an image can be performed. Further, according to the present example embodiment, the auxiliary warning line can be generated by the predetermined time period.

Figure 8:
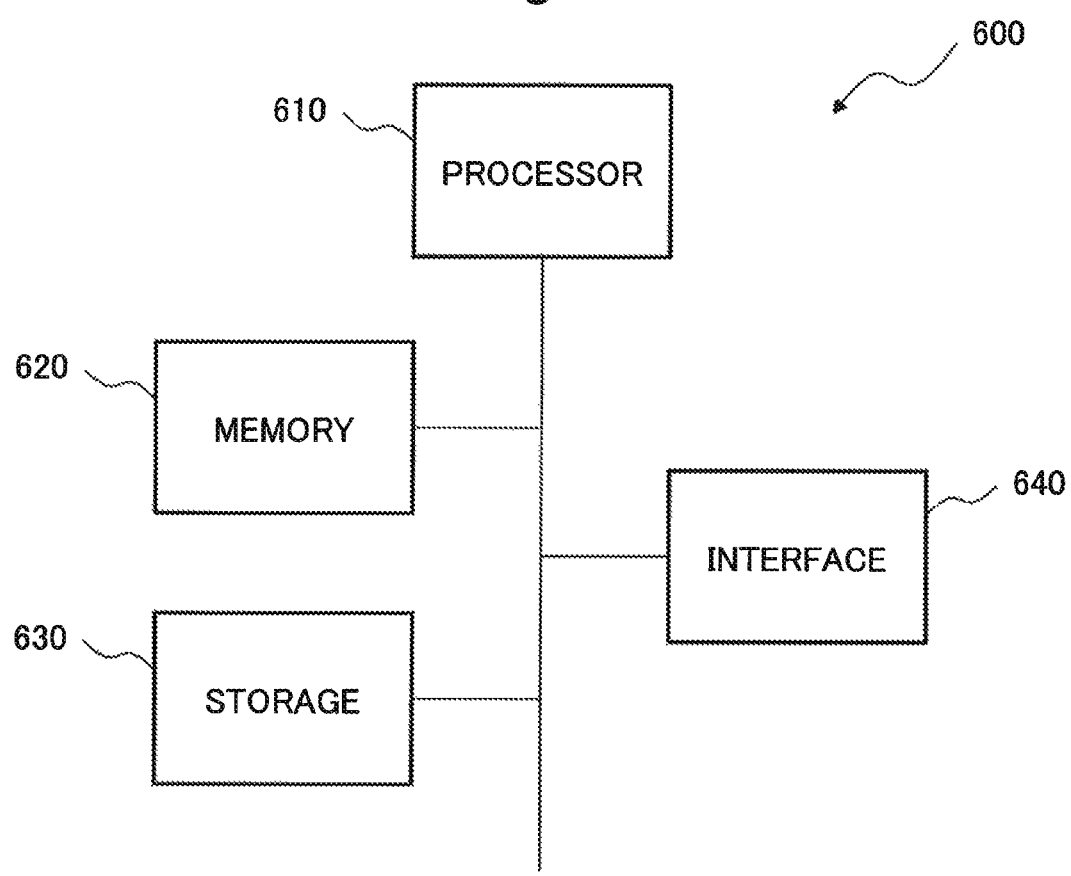
FIG. 8 is a block diagram illustrating one example of a hardware configuration of a computer that realizes an intrusion detection device according to the first example embodiment of the present invention.

FIG. 8 is a block diagram illustrating one example of a hardware configuration of a computer that realizes the intrusion detection device according to the first example embodiment of the present invention. A computer 600 includes a processor 610, a memory 620, a storage 630, and an interface 640.

The processor 610 is, for example, a central processing unit (CPU). The memory 620 is equivalent to a main storage device. The storage 630 is equivalent to an auxiliary storage. The storage 630 includes, for example, a hard disk or a flash memory. Further, the storage 630 may include a reader/writer for a removable recording medium such as an optical disk and a universal serial bus (USB) flash drive. The interface 640 transmits/receives data to/from an external device.

The processor 610 executes a program stored on the memory 620 or the storage 630 and thereby can function as the detection unit 2 and the control unit 3 of the intrusion detection device 1.

The present invention can provide an intrusion detection method, in addition to the intrusion detection device. Further, the present invention can be provided also with a form including a program for causing a computer to function as the intrusion detection device and a computer-readable recording medium (an optical disk, a magnetic disk, or a semiconductor memory) recording the program. Further, the program according to the present invention may be downloaded onto a device via a network and may cause the device to function as the intrusion detection device.

Fifth Example Embodiment

Figure 9:
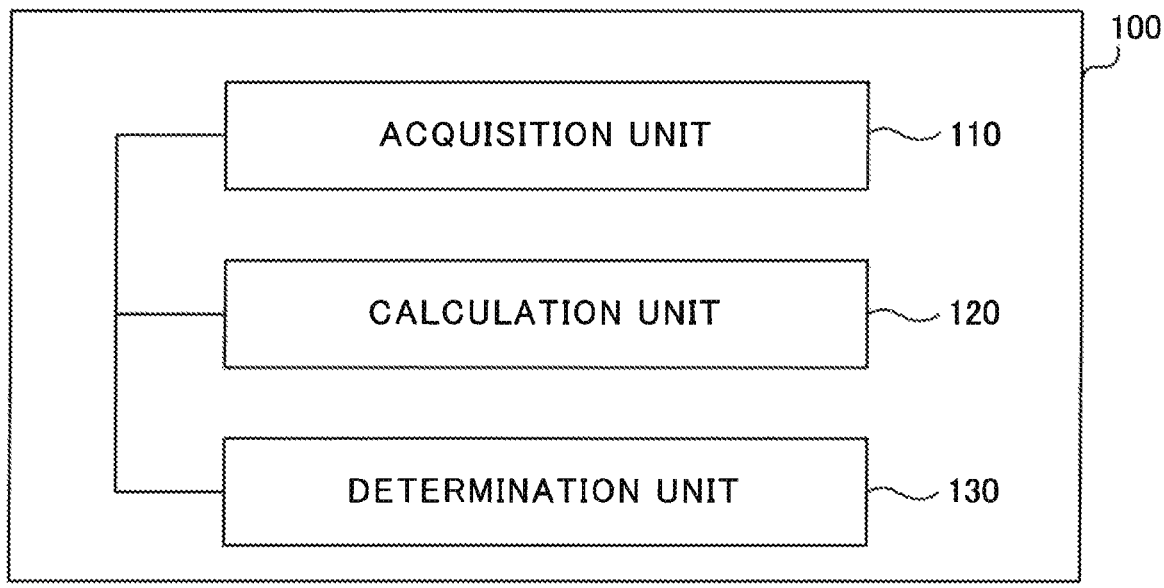
FIG. 9 is a block diagram illustrating one example of a configuration of a setting assistance device according to a fifth example embodiment of the present invention.

FIG. 9 is a block diagram illustrating a configuration of a setting assistance device 100 according to a fifth example embodiment of the present invention. The setting assistance device 100 is an information processing device for assisting (easing) setting of a region executed by a user based on an image. The setting assistance device 100 includes at least an acquisition unit 110, a calculation unit 120, and a determination unit 130. Note that, a hardware configuration of the setting assistance device 100 may be similar to the configuration of the computer 600 exemplarily illustrated in FIG. 8.

The acquisition unit 110 acquires coordinates in an image. The coordinates represent a line (a straight line, a curve, or a polygonal line) or a region designated by a user for an image of a three-dimensional space (i.e. an actual space) captured by an image-capture device such as a surveillance camera. Coordinates acquired by the acquisition unit 110 are represented by a two-dimensional coordinate system in which, for example, a predetermined position (an edge point, a center, and the like) of an image is an origin. In the present example embodiment, an image captured by an image-capture device can be said to be an image having a depth.

The number of coordinates acquired by the acquisition unit 110 is not limited to a specific number when a line can be defined. When, for example, a line designated by a user is a line segment, the acquisition unit 110 may acquire coordinates of an edge point (a start point and an end point) of the line segment. Alternatively, when the line designated by a user is a polygonal line, the acquisition unit 110 may acquire coordinates of edge points of a plurality of line segments configuring the polygonal line. Designation of coordinates is executed via an input device such as a mouse and a touch screen display. When a user manually draws a line by using the input device such as the touch screen display, the acquisition unit 110 acquires respective coordinates on the manually drawn line.

The calculation unit 120 calculates coordinates of a position located at a predetermined distance from a position in a three-dimensional space corresponding to coordinates acquired by the acquisition unit 110. The position referred to here is a position on a plane in an actual three-dimensional space and therefore is different from coordinates in a (two-dimensional) image. For more detail, the calculation unit 120 calculates coordinates in an image of a position located at the predetermined distance from the position in the three-dimensional space of the line designated by a user.

Figure 10A:
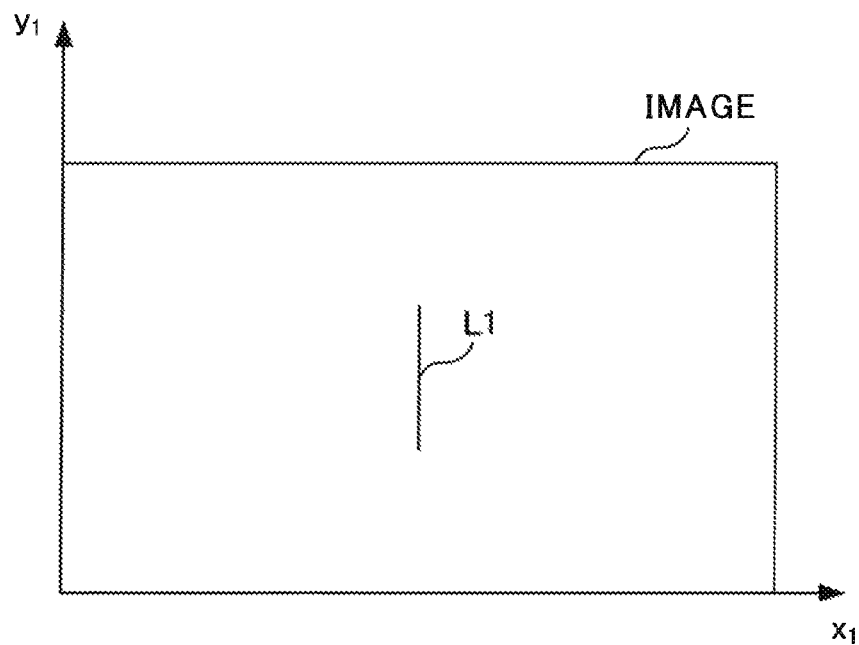
FIG. 10A is a first schematic diagram for illustrating coordinates calculated by a calculation unit.
Figure 10B:
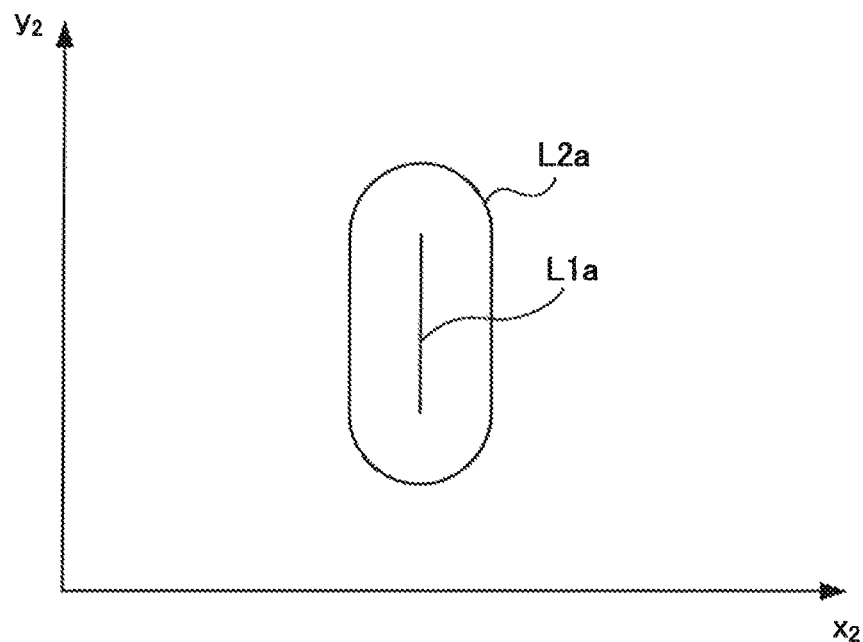
FIG. 10B is a second schematic diagram for illustrating coordinates calculated by the calculation unit.
Figure 10C:
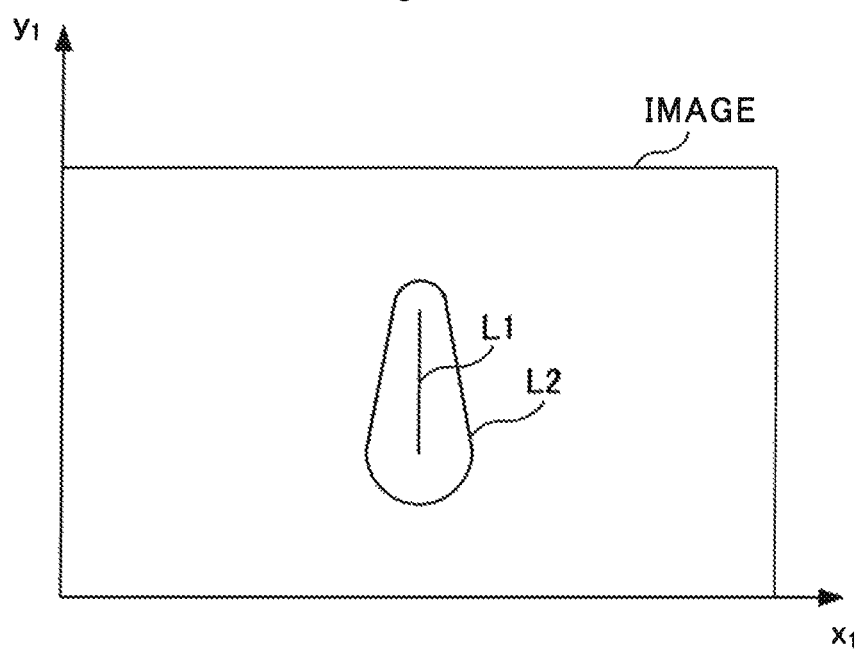
FIG. 10C is a third schematic diagram for illustrating coordinates calculated by the calculation unit.

FIG. 10A, FIG. 10B, and FIG. 10C each are a schematic diagram for illustrating coordinates calculated by the calculation unit 120. FIG. 10A is a diagram exemplarily illustrating a line L1 designated for an image. FIG. 10B is a diagram exemplarily illustrating a line L1a of the three-dimensional space corresponding to the line L1 and a line L2a obtained by connecting positions located at an equal distance from the line L1a. FIG. 10C is a diagram exemplarily illustrating the line L1 and a line L2 on an image corresponding to the line L2a.

Note that, it is assumed that the images exemplarily illustrated in FIG. 10A and FIG. 10C are different in depth in a direction of $y_1$ axis in the figures. In other words, it is assumed that in the images exemplarily illustrated in FIG. 10A and FIG. 10C, coordinates having a larger component of the $y_1$ axis represent a farther position. Further, an object in an image is captured as a smaller image in the image as a distance from an image-capture device increases. The reason is that a magnification of an object in an image is inversely proportional to a distance between the object and the image-capture device. Therefore, in the images exemplarily illustrated in FIG. 10A and FIG. 10C, even when objects have the same size, an object located at coordinates having a larger component of the $y_1$ axis is captured as a smaller image.

An $x_1y_1$ coordinate system of FIG. 10A and FIG. 10C is a coordinate system (screen coordinate system) defined for an image. Coordinates based on this coordinate system, i.e. coordinates on an image are a numerical value indicating a position of each pixel in which a pixel of a predetermined position of an image is a basis (origin). On the other hand, an $x_2y_2$ coordinate system of FIG. 10B is a coordinate system (world coordinate system) corresponding to an actual three-dimensional space and is different from the coordinate system of FIG. 10A and FIG. 10C. An $x_2$ axis component and a $y_2$ axis component in FIG. 10B is, for example, equivalent to a latitude and a longitude.

The line L2 of FIG. 10C does not have the same shape as in the line L2a of FIG. 10B. The reason is that in the images indicated by FIG. 10A and FIG. 10C, apparent distortion (deformation) due to a depth difference occurs. Therefore, even when being located at an equal distance from the line L1a in an actual three-dimensional space, the line L2 in the image is not located at an equal distance from the line L1 in the image. For more detail, the line L2 has a shorter distance from the line L1 on the image as a component of the $y_1$ axis is larger.

The calculation unit 120 calculates coordinates of each point on the line L2 of FIG. 10C by using a predetermined function. This function can be defined, for example, based on calibration previously executed. The calibration referred to here is executed, for example, by disposing a reference object having a known size (a bar having a predetermined length, a mark having a predetermined size and the like) at a plurality of positions in a space to be image-captured and associating a size (e.g. the number of pixels) in an image of the reference object with an actual size.

The determination unit 130 determines a region to be set for the coordinates acquired by the acquisition unit 110 based on the coordinates calculated by the calculation unit 120. For example, the determination unit 130 determines, as a region corresponding to the line L1, a region (e.g. a region inside the line L2 in FIG. 10C) surrounded by a closed curve represented by the coordinates calculated by the calculation unit 120. In the following, the region determined by the determination unit 130 will be referred to also as a "setting region".

The determination unit 130 may determine, as a setting region, a region partially different from the region surrounded by the closed curve represented by the coordinates calculated by the calculation unit 120. The determination unit 130 may determine, as a setting region, for example, a part of the region surrounded by the closed curve represented by the coordinates calculated by the calculation unit 120. In other words, the determination unit 130 may set, as a setting region, a region in which a part of the region surrounded by the closed curve represented by the coordinates calculated by the calculation unit 120 is excluded. At that time, the determination unit 130 may determine a region excluded from the setting region based on another piece of information. The another piece of information referred to here is, for example, coordinates acquired by the acquisition unit 110, a feature extracted from an image, a predetermined rule and the like. Further, the determination unit 130 may determine a region excluded from the setting region based on an operation of a user.

Figure 11:
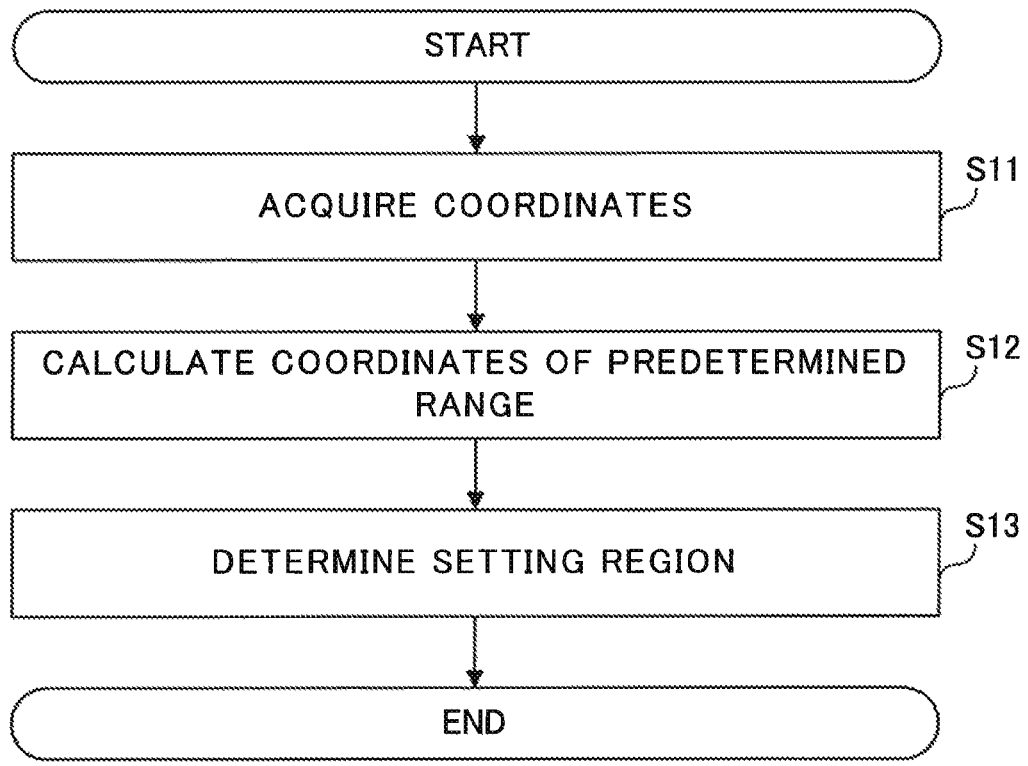
FIG. 11 is a flowchart illustrating one example of processing executed by a setting assistance device.

FIG. 11 is a flowchart illustrating processing executed by the setting assistance device 100. In step S11, the acquisition unit 110 acquires coordinates designated by a user using a line with respect to an image acquired by capturing a three-dimensional space. At that time, the image is captured by the image-capture device and is displayed by a display device. A user designates, using the input device such as a mouse, coordinates for the image displayed by the display device. When FIG. 10A is used as an example, the acquisition unit 110 acquires coordinates specifying the line L1 (e.g. a start point and an end point of the line L1).

In step S12, the calculation unit 120 calculates coordinates of a position located at a predetermined distance from a position of a three-dimensional space corresponding to a line represented by the coordinates acquired in step S11. When FIG. 10C is used as an example, the calculation unit 120 calculates respective coordinates on the line L2 based on the coordinates specifying the line L1.

In step S13, the determination unit 130 determines a setting region based on the coordinates calculated in step S12. The determination unit 130 determines a setting region in such a way as to include at least a part of a region surrounded by the line L2. When FIG. 10C is used as an example, the determination unit 130 may determine, as the setting region, a part or the whole of the region surrounded by the line L2. The determination unit 130 may determine the setting region in such a way as to include not only the region surrounded by the line L2 but also another region, by using another piece of information described above.

As described above, the setting assistance device 100 of the present example embodiment includes a configuration that determines the setting region based on a line designated by a user. A user has only to designate, based on this configuration, a line when setting the setting region, and it is unnecessary to input the setting region itself on his/her own. Therefore, according to the setting assistance device 100 of the present example embodiment, it is easy for a user to accurately set the setting region for an image having a depth. In other words, the setting assistance device 100 can assist a setting operation executed by a user.

Sixth Example Embodiment

Figure 12:
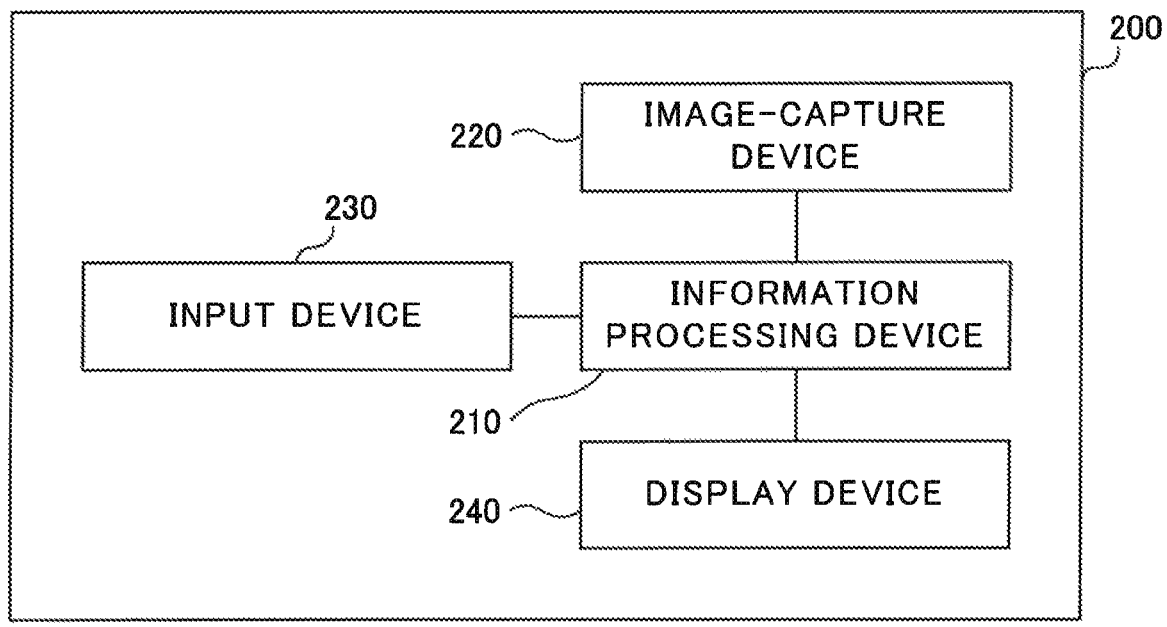
FIG. 12 is a block diagram illustrating one example of a configuration of an intrusion detection system according to a sixth example embodiment.

FIG. 12 is a block diagram illustrating a configuration of an intrusion detection system 200 according to a sixth example embodiment. The intrusion detection system 200 is an information processing system for detecting intrusion of an object. In several forms, the object referred to here is a person such as a suspicious individual. However, the object referred to here may be an animal other than a person or may be a movable machine such as an automobile and a robot. In the following, it is assumed that an object detected by the intrusion detection system 200 is a person.

The intrusion referred to here refers to an entry that may be illicit among entries of an object into a specific region. However, in the example embodiments of the present invention, whether an object having entered a specific region actually has an illicit purpose is not problematic. Whether or not an object having entered the specific region actually has an illicit purpose may be determined, for example, using a system separate from the intrusion detection system 200 or may be determined by a person. In other words, the intrusion detection system 200 may be a system for detecting a sign or possibility of intrusion or may be a system for detecting an entry of an object (regardless of whether to be illicit).

The intrusion detection system 200 includes at least an information processing device 210, an image-capture device 220, an input device 230, and a display device 240. A plurality of information processing devices 210, a plurality of image-capture devices 220, a plurality of input devices 230, and a plurality of display devices 240 may be included in the intrusion detection system 200. Further, a part or the whole of the information processing device 210, the image-capture device 220, the input device 230, and the display device 240 may be configured as a single device.

The intrusion detection system 200 may include another configuration, in addition to the information processing device 210, the image-capture device 220, the input device 230, and the display device 240. The intrusion detection system 200 may include, for example, a device or equipment (a speaker, a siren, a warning light, and the like) for reporting detection of intrusion.

The information processing device 210 detects a person by using an image. Further, the information processing device 210 assists setting executed by a user (operator) in order to detect a person. The information processing device 210 is, for example, a computer device such as a personal computer. The information processing device 210 is communicably connected to the image-capture device 220, the input device 230, and the display device 240. Communication performed by the information processing device 210 may be wired or wireless and may be performed via another device (i.e. indirectly).

The image-capture device 220 captures an image. The image-capture device 220 is, for example, a surveillance camera disposed in a given place and continuously image-capturing a specific region. The image-capture device 220 image-captures a region to be monitored and generates image data representing a image of the region. The image-capture device 220 supplies the image data to the information processing device 210.

The input device 230 accepts an operation of a user. The input device 230 is, for example, a mouse or a keyboard.

Further, the input device 230 may be a touch screen display configured integrally with the display device 240. The input device 230 supplies input data representing an operation of a user to the information processing device 210.

The display device 240 displays an image. The display device 240 is, for example, a liquid crystal display. The display device 240 displays an image according to image data supplied from the information processing device 210. The display device 240 may display an image captured, for example, by the image-capture device 220. Alternatively, the display device 240 may display a screen (hereinafter, referred to also as a "setting screen") for executing, by a user, various types of settings relating to surveillance. Note that, the intrusion detection system 200 may include a display device that displays an image captured by the image-capture device 220 and another display device that displays a setting screen.

Figure 13:
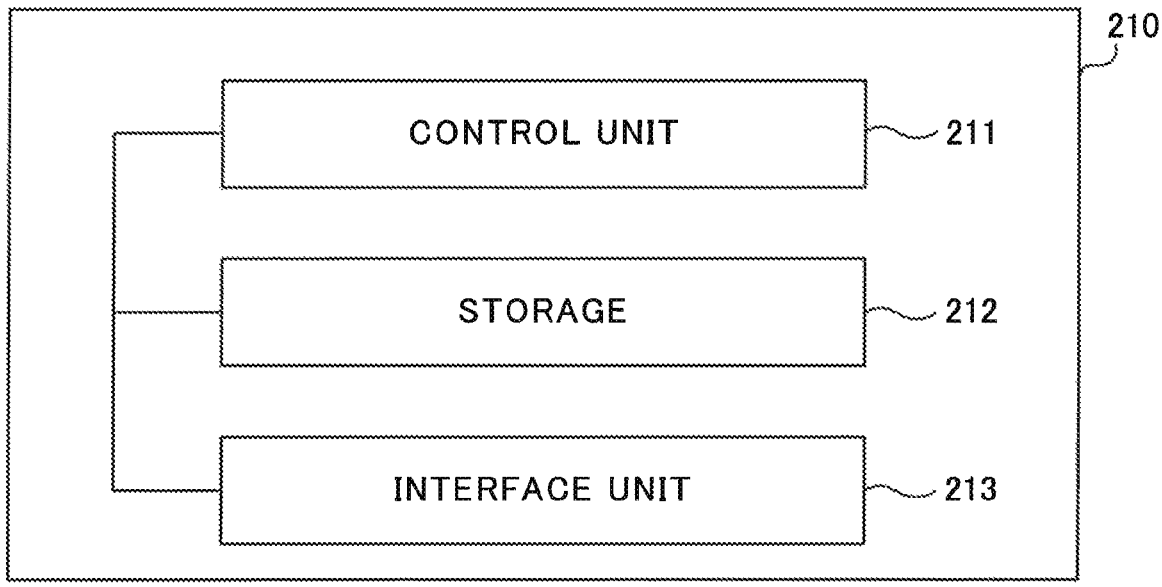
FIG. 13 is a block diagram illustrating one example of a hardware configuration of an information processing device.

FIG. 13 is a block diagram illustrating a hardware configuration of the information processing device 210. The information processing device 210 includes a control unit 211, a storage 212, and an interface unit 213. The information processing device 210 is equivalent to one example of the setting assistance device 100 described in the fifth example embodiment. For more detail, the information processing device 210 can realize a function equivalent to the setting assistance device 100 by executing, by the control unit 211, a predetermined program.

The control unit 211 includes a processor (arithmetic processing device) such as a central processing unit (CPU) and a main memory (main storage). The control unit 211 may include a plurality of processors in such a way as to include, for example, a graphics processing unit (GPU) for image processing in addition to a CPU. The control unit 211 executes a program and realizes several functions relating to detection of a person.

The storage 212 stores data used in the control unit 211. The storage 212 may store, for example, a program executed by the control unit 211. The storage 212 includes a storage device such as a hard disk drive. Further, the storage 212 may include a reader/writer of a removable storage medium (a memory card or the like) for the information processing device 210. Transmission/reception of data in the information processing device 210 may be executed via this removable storage medium.

The interface 213 transmits/receives data to/from the image-capture device 220, the input device 230, the display device 240 and data. The interface unit 213 can transmit/receive data in accordance with a predetermined standard such as Universal Serial Bus (USB) and High-Definition Multimedia Interface (HDMI). The interface unit 213 may include an interface connected to a network such as the Internet.

A configuration of the intrusion detection system 200 is as described below. The intrusion detection system 200 based on the configuration detects a person based on an image captured by the image-capture device 220. The information processing device 210 executes the following processing as processing relating to detection of a person.

Figure 14:
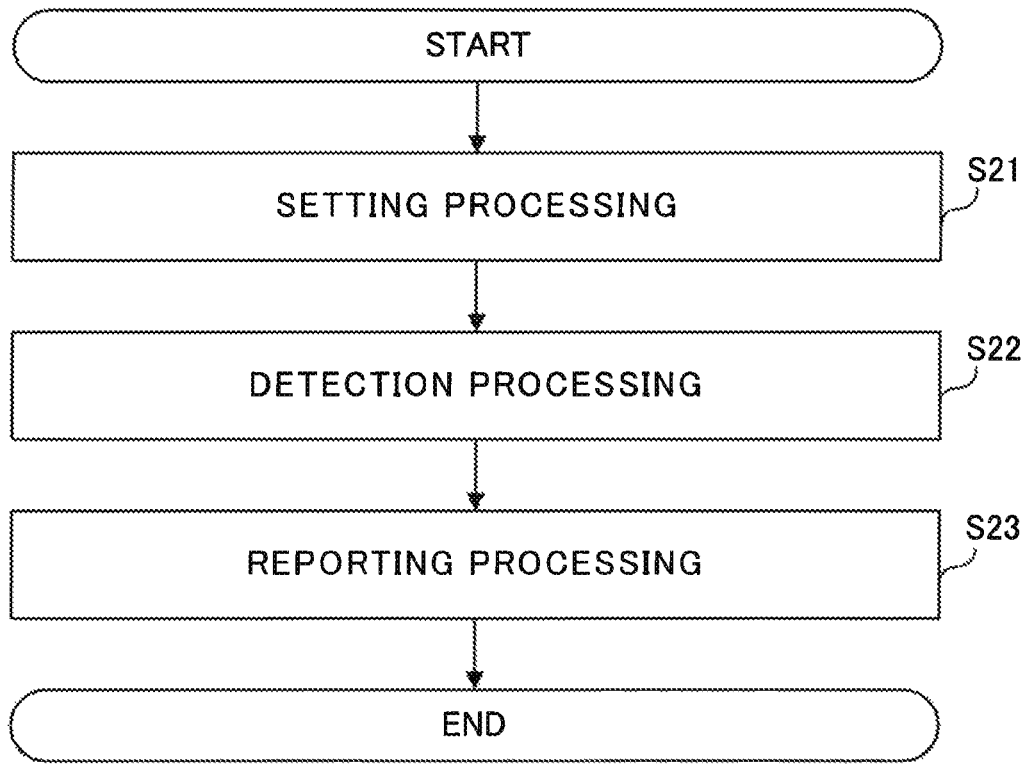
FIG. 14 is a flowchart illustrating one example of processing executed by the information processing device.

FIG. 14 is a flowchart illustrating an outline of processing executed by the information processing device 210. The processing executed by the information processing device 210 is roughly classified into setting processing (step S21), detection processing (step S22), and reporting processing (step S23). Note that, it is not always necessary to execute detection processing immediately after setting processing. Setting processing is sufficient when being previously executed at least once and therefore is not processing necessary every time detection processing is executed.

The setting processing is processing of setting the warning line and the auxiliary warning region. The warning line of the present example embodiment is a straight line set by an operation of a user. Further, the intrusion detection system 200 based on the configuration detects a person based on an image captured by the image-capture device 220. The auxiliary warning region of the present example embodiment is a region set based on the warning line and is equivalent to one example of the setting region in the fifth example embodiment. The Setting processing of the present example embodiment includes processing of assisting setting of the auxiliary region executed by a user.

The detection processing is processing for detecting an entry of a person into the auxiliary warning region. The detection processing may further include processing for detecting a pass of the warning line by a person. Further, the detection processing may include processing for detecting a stay of a person in the auxiliary warning region, i.e. a continued stay of a person in the auxiliary warning region for a predetermined time period or longer. In the following, a person detected by detection processing will be referred to also as a "person to watch out for".

The reporting processing is processing for reporting a detection result based on detection processing. In the reporting processing, for example, an entry into or a stay in the auxiliary warning region or a pass of the warning line by a person to watch out for is reported. Reporting based on reporting processing may be executed by the display device 240 or may be executed by a siren or a warning light.

Figure 15:
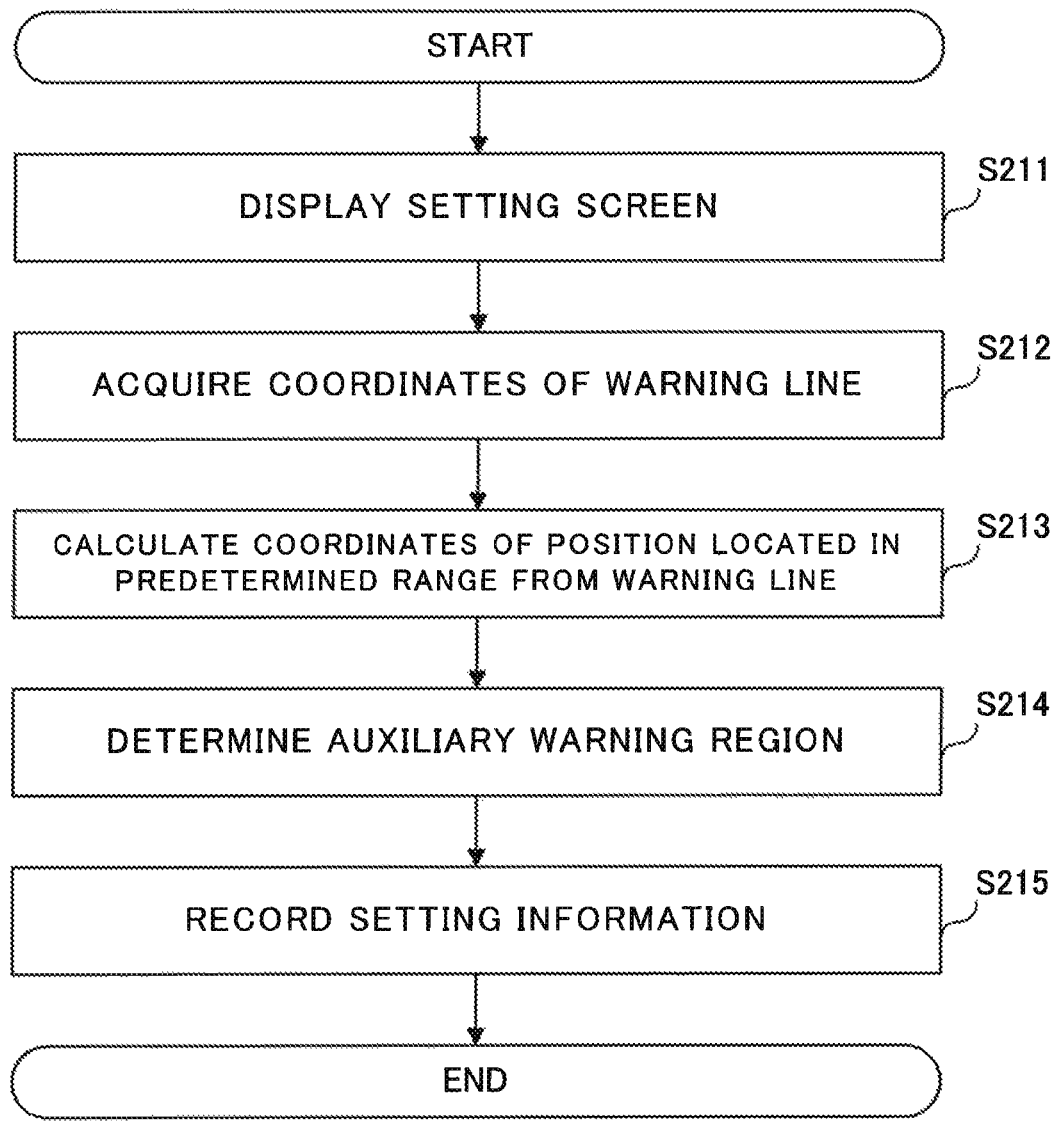
FIG. 15 is a flowchart illustrating one example of setting processing.

FIG. 15 is a flowchart illustrating details of setting processing. In step S211, the control unit 211 displays a setting screen on the display device 240. For more detail, the control unit 211 supplies image data for displaying the setting screen to the display device 240. The control unit 211 supplies the image data to the display device 240 via the interface unit 213.

Figure 16A:
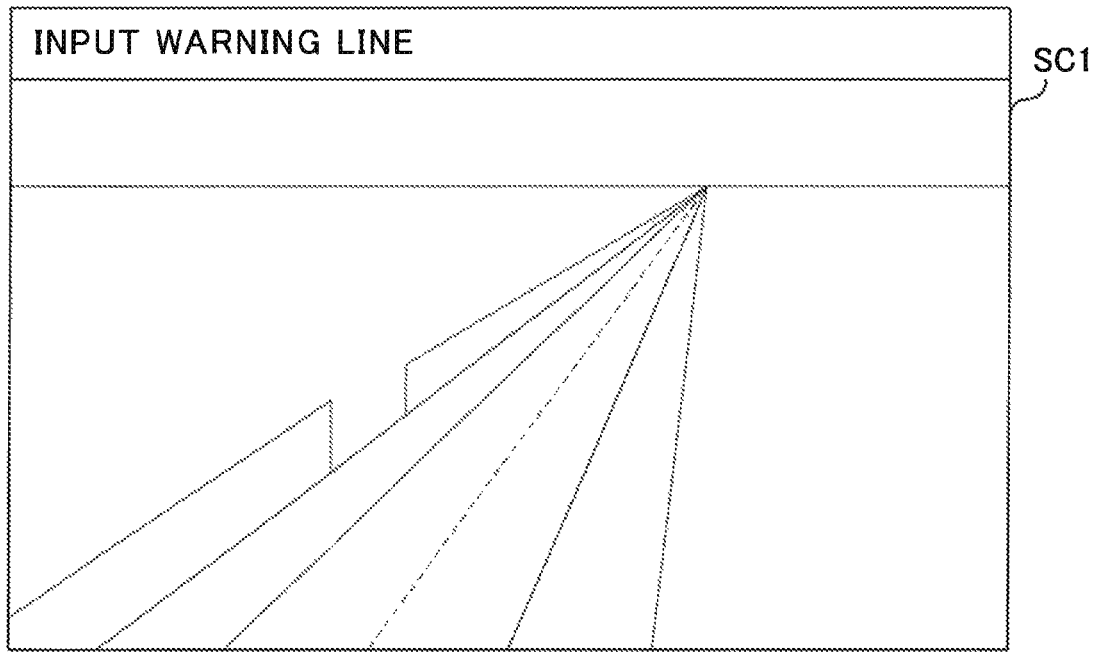
FIG. 16A is a diagram exemplarily illustrating screen transition of a setting screen.
Figure 16B:
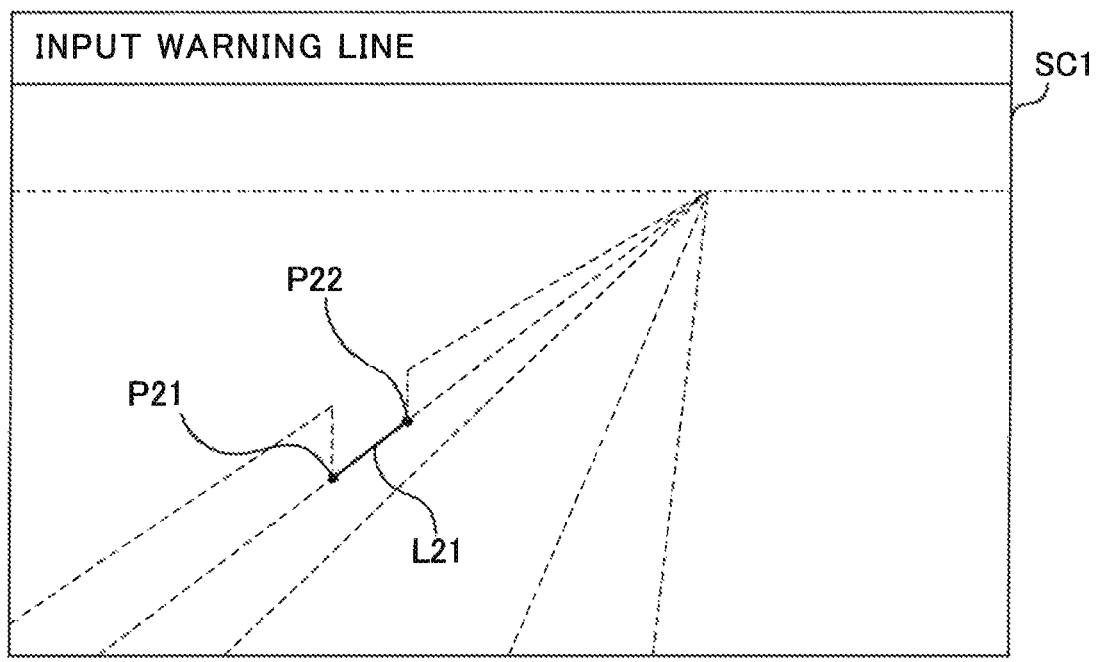
FIG. 16B is another diagram exemplarily illustrating screen transition of a setting screen.

FIG. 16A and FIG. 16B each are a diagram exemplarily illustrating screen transition of the setting screen displayed in step S211. FIG. 16A is a diagram illustrating one example of the setting screen. A setting screen SC1 includes at least an image captured by the image-capture device 220. Further, the setting screen may include a message such as "input a warning line" for prompting a user to execute inputting. A user inputs the warning line by using the input device 230. Note that, an image illustrated in the present example embodiment may include an emphasized, exaggerated, or simplified description in order to make understanding easy.

In step S212, the control unit 211 acquires coordinates. For more detail, the control unit 211 acquires input data from the input device 230 via the interface unit 213 and thereby acquires coordinates. In the example of FIG. 16B, coordinates that define the warning line are two edge points of a line segment that is the warning line.

FIG. 16B is a diagram exemplarily illustrating a warning line L21 designated for the image exemplarily illustrated in FIG. 16A. In this example, the warning line L21 is a line segment connecting coordinates P21 and coordinates P22. A user designates coordinates P21 and coordinates P22 by using the input device 230 and thereby can set the warning line L21.

In step S213, the control unit 211 calculates coordinates of a position located at a predetermined distance (e.g. 100 meters) from the warning line. In other words, the control unit 211 calculates coordinates of a position having a fixed distance from the warning line in an actual space. The control unit 211 calculates coordinates, for example, by following equation (1).

$$R_{dist}=f(P_a,P_b) \quad (1)$$

In equation (1), $f(P_a, P_b)$ is a function for converting a real distance between coordinates $P_a$ and $P_b$ on an image (i.e. an actual distance in a three-dimensional space). Further, $R_{dist}$ represents a constant equivalent to a predetermined distance. Note that, the function $f(P_a, P_b)$ can be previously defined by calibration using an image captured by the image-capture device 220. The function $f(P_a, P_b)$ is a function of calculating a distance between two coordinates by converting coordinates $P_a$ and $P_b$ of a screen coordinate system to two coordinates of a world coordinate system and is calculable by a well-known technique.

When, for example, coordinates having a real distance of 100 meters from the coordinates P21 are determined, the control unit 211 substitutes the coordinates P21 for $P_a$ in equation (1) and calculates $P_b$ satisfying $R_{dist}$=100. Note that, there are a plurality of $P_b$ (i.e. coordinates having a real distance of 100 meters from the coordinates P21) satisfying $R_{dist}$=100. The control unit 211 executes such calculation for all coordinates on an image included in the warning line L21. The control unit 211 calculates coordinates, for example, as described below.

Figure 17A:
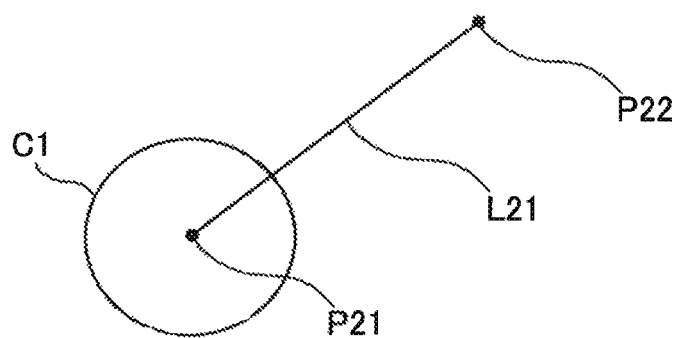
FIG. 17A is a first diagram exemplarily illustrating a method for calculating coordinates.

FIG. 17A is a diagram exemplarily illustrating a curve C1 that is a set of coordinates in which a real distance from the coordinates P21 is an equal distance. In this example, the curve C1 is a closed curve approximate to a circle around the coordinates P21 but is not a true circle in a precise sense. In the curve C1, coordinates having a farther real distance from the image-capture device 220 have a smaller apparent distance from the coordinates P21.

Figure 17B:
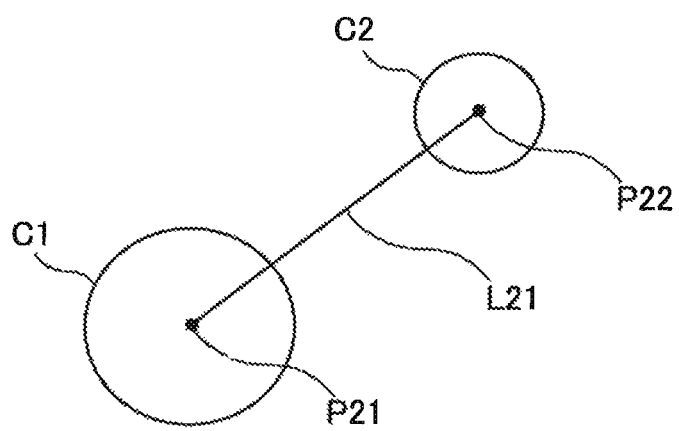
FIG. 17B is a second diagram exemplarily illustrating a method for calculating coordinates.

FIG. 17B is diagram exemplarily illustrating, in addition to the curve C1, a curve C2 that is a set of coordinates in which a real distance from the coordinates P22 is an equal distance. The curve C2 is a circular graphic similar to the curve C1, but an apparent size is smaller than the size of the curve C1. The reason is that the coordinates P22 is farther than the coordinates P21 in a distance from the image-capture device 220. Note that, the control unit 211 calculates a similar curve for all coordinates included in the warning line L21, in addition to the coordinates P21 and P22.

Figure 17C:
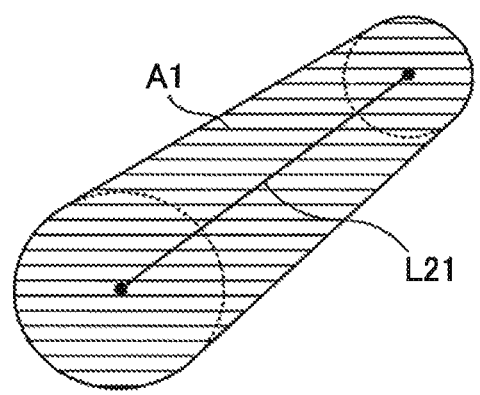
FIG. 17C is a third diagram exemplarily illustrating a method for calculating coordinates.

FIG. 17C is a diagram exemplarily illustrating a region A1 that is a basis for determining the auxiliary warning region. The region A1 is a set of coordinates $P_a$ satisfying $R_{dist} \geq f(P_a, P_b)$ when coordinates $P_b$ are any coordinates on the warning line L21. Further, a borderline of the region A1 is a set of coordinates in which a real distance from the warning line L21 is an equal distance.

When coordinates are calculated in step S213, the control unit 211 executes processing of step S214. In step S214, the control unit 211 determines the auxiliary warning region based on the coordinates calculated in step S213. The control unit 211 can determine the auxiliary warning region, for example, by any one of the following methods.

The control unit 211 may directly set the region A1 in the example of FIG. 17C as the auxiliary warning region. This method needs a minimum calculation amount in comparison with other methods to be described later.

Further, the control unit 211 may determine the auxiliary warning region based on a direction (orientation) where a person crosses the warning line. This method can be also said to be a method for determining the auxiliary warning line based on a moving direction of a person. In several forms, the moving direction of a person is previously determined for the warning line. The moving direction of a person may be set by a user via the setting screen. Alternatively, the moving direction of a person may be determined based on an actual movement of a person detected from an image. The moving direction of a person may be patterned into several typical directions (e.g. two directions).

Figure 18A:
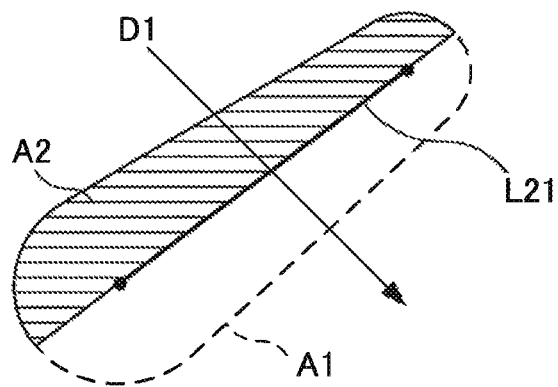
FIG. 18A is a diagram exemplarily illustrating a first auxiliary warning region.
Figure 18B:
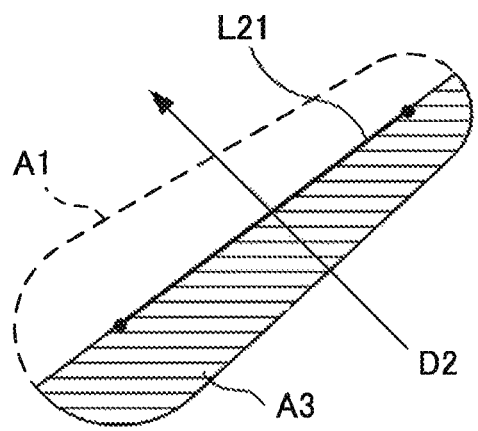
FIG. 18B is a diagram exemplarily illustrating a second auxiliary warning region.

FIG. 18A and FIG. 18B each are a diagram exemplarily illustrating the auxiliary warning region determined based on the moving direction of a person. Both auxiliary warning regions A2 and A3 are determined based on the region A1 of FIG. 17C. The auxiliary warning region A2 is an auxiliary warning region in which the moving direction of a person is a direction of an arrow D1. On the other hand, the auxiliary warning region A3 is an auxiliary warning region in which the moving direction of a person is a direction of an arrow D2.

In this case, the control unit 211 sets, as the auxiliary warning region, a remaining region acquired by excluding a region located ahead of the warning line L21 in the region A1 when viewed from a front side of the moving direction of a person. For more detail, the control unit 211 identifies an intersection between a straight line including the warning line L21 and a borderline of the region A1 and sets, as the auxiliary warning region, any one of regions surrounded by the straight line in the region A1 based on the moving direction of a person.

In this manner, the control unit 211 may determine the auxiliary warning region according to the moving direction of a person. When, for example, the warning line is set in a place where the moving direction is restricted to one direction, the control unit 211 may determine the auxiliary warning region as in FIG. 18A and FIG. 18B. In the auxiliary warning region determined in this manner, a region unnecessary in detection in the region A1 is excluded, and thereby false detection (i.e. unintended detection) of intrusion can be reduced. By doing in such a manner, a user can use, in intrusion detection, an appropriate auxiliary warning region different depending on the moving direction of a person.

Further, the control unit 211 may determine the auxiliary warning region based on an operation of a user. The control unit 211 may determine the auxiliary warning region, for example, based on coordinates acquired in step S212, i.e. coordinates designated by a user as an edge point of the warning line. Alternatively, the control unit 211 may determine the auxiliary warning region based on another operation (the moving direction of a person, coordinates, and the like) that is a determination reference for the auxiliary warning region.

Figure 19:
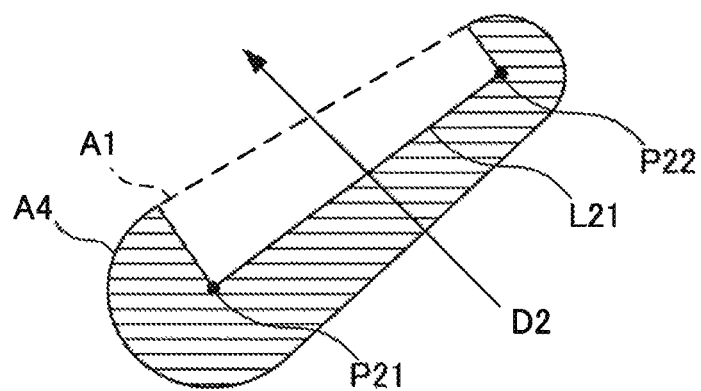
FIG. 19 is a diagram exemplarily illustrating a third auxiliary warning region.

FIG. 19 is a diagram illustrating another example of the auxiliary warning region. An auxiliary warning region A4 is determined based on the region A1 of FIG. 17C. In this example, the control unit 211 identifies an intersection between a vertical line to the warning line L21 crossing an edge point of the warning line L21 and a borderline of the region A1 and sets, as the auxiliary warning region, a region surrounded by the borderline, the vertical line, and the warning line L21. The auxiliary warning region determined in this manner can also reduce false detection of intrusion similarly to the examples of FIG. 18A and FIG. 18B.

Further, the control unit 211 may determine the auxiliary warning region by using a feature extracted from an image captured by the image-capture device 220. The feature referred to here is, for example, an edge or a feature value of Histograms of Oriented Gradients (HOG). The control unit 211 extracts such a feature from an image captured by the image-capture device 220, and thereby can determine the auxiliary warning region based on the extracted feature.

Figure 20:
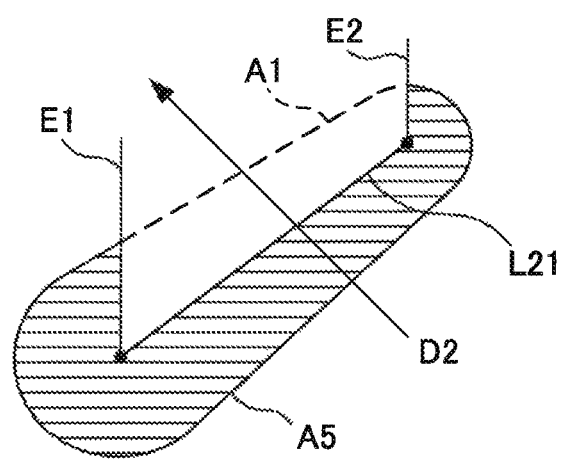
FIG. 20 is a diagram exemplarily illustrating a fourth auxiliary warning region.

FIG. 20 is a diagram illustrating further another example of the auxiliary warning region. An auxiliary warning region A5 is determined based on the region A1 of FIG. 17C. In this example, it is assumed that the control unit 211 has detected edges E1 and E2 in a vicinity of the warning line L21. The edges E1 and E2 each are, for example, a pixel group in which a change in brightness of a specific direction in an image is larger than a predetermined threshold. In this case, the control unit 211 determines, as the auxiliary warning region, a region surrounded by the warning line L21, the edges E1 and E2, and a borderline of the region A1. The auxiliary warning region determined in this manner can also reduce false detection of intrusion similarly to the examples of FIG. 18A, FIG. 18B, and FIG. 19.

Note that, the control unit 211 may be configured to select any one of a plurality of candidates for the auxiliary warning region. In this case, the control unit 211 may display a plurality of candidates for the auxiliary warning region on the display device 240, together with an image captured by the image-capture device 220 and select any one of the candidates according to an operation of a user. A user confirms, for example, candidates for the auxiliary warning region displayed by being overlapped with the image and selects any desired candidate. At that time, the control unit 211 may display a plurality of candidates different in $R_{dist}$ on the display device 240 and cause a user to select any one of the candidates.

After determining the auxiliary warning region, the control unit 211 executes processing of step S215. In step S215, the control unit 211 records setting information on the storage unit 212. The setting information includes information indicating the warning line and information indicating the auxiliary warning region. The setting information stored on the storage unit 212 is used in detection processing. The setting information is, for example, coordinates indicating a border between the warning line and the auxiliary warning region.

Figure 21:
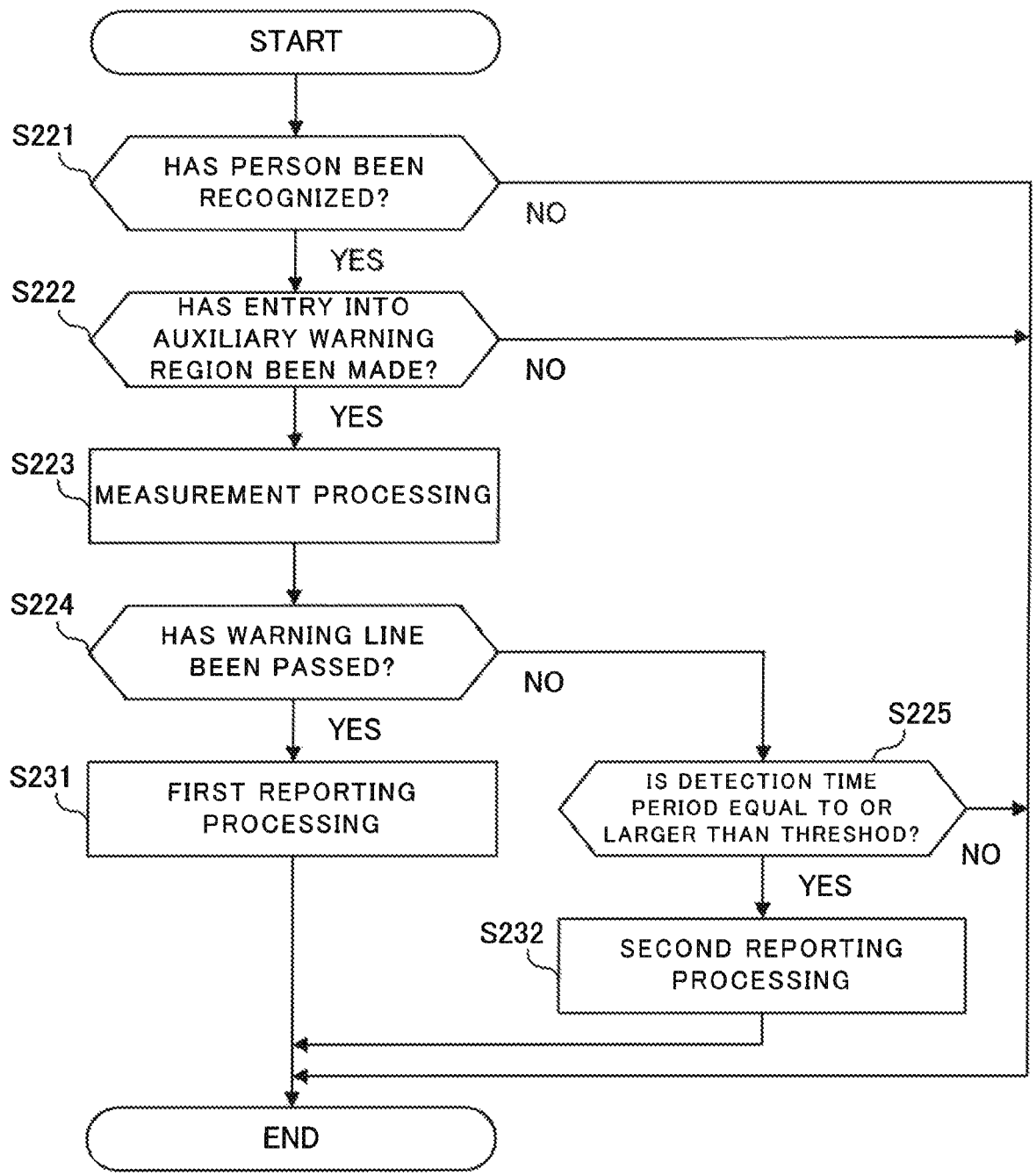
FIG. 21 is a flowchart illustrating one example of detection processing and reporting processing.

FIG. 21 is a flowchart illustrating details of detection processing (steps S211 to S224) and reporting processing (steps S231 to S232). The control unit 211 starts executing a series of processing steps illustrated in FIG. 21 at a timing of starting surveillance based on an image. The start timing of processing by the control unit 211 is, for example, a timing of starting image-capturing by the image-capture device 220 or a timing instructed by a user. The control unit 211 executes the following processing for each frame of an image. Note that, for convenience of description, in the following, it is assumed that there is one person or less detected in each frame.

In step S221, the control unit 211 determines whether a person has been recognized from an image. The control unit 211 can recognize a person by a well-known object recognition technique. The recognition by the control unit 211 may be any one of general object recognition and specific object recognition. In other words, the control unit 211 may recognize an object having a person-like feature or recognize a person having a specific feature previously recorded in a database (so-called black list). When a person has not been recognized from the image (S221: NO), the control unit 221 ends the processing without executing reporting processing.

When a person has been recognized from the image (S221: YES), the control unit 211 further executes determination of step S222. In step S222, the control unit 211 determines whether the person recognized in step S221 has entered the auxiliary warning region. At that time, the control unit 211 identifies coordinates of the auxiliary warning region based on setting information recorded in setting processing. The control unit 211 may determine, when at least a part of the person recognized in step S221 is included in the auxiliary warning region, that the person has entered the region or may determine, when the whole of the person is included in the region, that the person has entered the region. When the person recognized in step S221 does not enter the auxiliary warning region (S222: NO), the control unit 211 ends the processing without executing reporting processing.

When the person recognized in step S221 has entered the auxiliary warning region (S222: YES), the control unit 211 further executes measurement processing of step S223. The measurement processing is processing of measuring a length of a time period (hereinafter, referred to also as a "detection time period") in which a certain person is being detected in the auxiliary warning region. In step S223, the control unit 211 starts measuring the detection time period when the person recognized in step S221 has not been detected in the auxiliary warning region in a last frame. On the other hand, the control unit 211 adds the already-measured detection time period for one frame when the person recognized in step S221 has been detected in the auxiliary warning region also in the last frame. Note that, the control unit 211 resets the detection time period when in a frame next to a frame where a person has been detected in the auxiliary warning region, the person is not detected.

In step S224, the control unit 211 determines whether the person recognized in step S221 has passed the warning line. When the person recognized in step S221 has passed the warning line (S224: YES), the control unit 211 executes first reporting processing (step S231).

When the person recognized in step S221 has not passed the warning line (S224: NO), the control unit 211 further executes determination of step S225. In step S225, the control unit 211 determines whether the detection time period measured by measurement processing is equal to or larger than a predetermined threshold. When the detection time period is smaller than the predetermined threshold (S225: NO), the control unit 211 ends the processing without executing reporting processing. On the other hand, when the detection time period is equal to or larger than the predetermined threshold (S225: YES), the control unit 211 executes second reporting processing (step S232).

The first reporting processing is processing for displaying a message that is, for example, "a person to watch out for has passed a warning line" on the display device 240. In contrast, the second reporting processing is processing for displaying a message that is, for example, "a person to watch out for has entered an auxiliary warning region" on the display device 240. In the second reporting processing, the control unit 211 may report the measured detection time period together. Note that, the first reporting processing and the second reporting processing are the same processing.

As described above, according to the intrusion detection system 200 of the present example embodiment, setting of the warning line and the auxiliary warning region to detection and reporting of a person can be executed. When the warning line and the auxiliary warning region are set, the information processing device 210 enables a user to easily set the auxiliary warning region (i.e. the setting region), similarly to the setting assistance device 100 of the fifth example embodiment.

In general, an image in which a three-dimensional space is image-captured includes positions having different distances (i.e. depths) from the image-capture device 220. Thereby, an image captured by the image-capture device 220 generates perspective for a viewer (i.e. a user). Therefore, when a certain object is included in such an image, visual perception of the object in the image changes depending on a position (i.e. a distance from the image-capture device 220) of the object.

A user may desire to set the auxiliary warning region in a range of an equal distance from the warning line. The auxiliary warning region is frequently set as "a range at 100 meters from the warning line", for example. Especially when an object can enter from any position of a border of the auxiliary warning region, it can also be said that range setting at such an equal distance is reasonable.

However, as described above, an image has depth. Therefore, an apparent distance in an image and an actual distance (real distance) in a three-dimensional space are not always matched. Therefore, in general, it is difficult for a user to manually input accurately a line such as a border of the auxiliary warning region.

On the other hand, the warning line is set, for example, at a place where people come in and out such as an entrance of a facility (a building, a park and the like) to be monitored. Such a place commonly has an external appearance discriminable from another place. For example, there is a gate at an entrance of a facility or there is no object (no railing, fence and the like) interfering with traffic of people. Therefore, it is conceivable that work for manually setting the warning line by a user is relatively easier than work for manually setting a region such as the auxiliary warning region.

In the present example embodiment, a user sets only the warning line relatively easily set manually in this manner and thereby can set the auxiliary warning region relatively difficult to set manually. In the auxiliary warning region determined by the intrusion detection system 200, real distances from the warning line have an equal distance, and therefore, a real distance from the warning line does not become short despite an intention of a user. According to such the auxiliary warning region, even when a person has entered from any position, an entry into or a stay in the auxiliary warning region can be appropriately determined.

Further, in the present example embodiment, a user can easily modify (edit) the auxiliary warning region to a more preferable shape, as necessary. Thereby, the intrusion detection system 200 can suppress detection against an intention of a user. The intrusion detection system 200 can reduce a possibility of detecting a person who does not need to be originally detected.

Modified Examples of Sixth Example Embodiment

The sixth example embodiment is applicable with the following modifications.

The warning line is not necessarily a straight line. The warning line may be, for example, a polygonal line or a curve or may be a combination of a polygonal line and a curve. Coordinates acquired by the information processing device 210 via the input device 230 is not limited to coordinates exemplified in the present example embodiment and may be similar to coordinates acquired by the acquisition unit 110 in the fifth example embodiment. The information processing device 210 sets a warning line based on coordinates of a polygonal line or a curve acquired via the input device 230.

Figure 22:
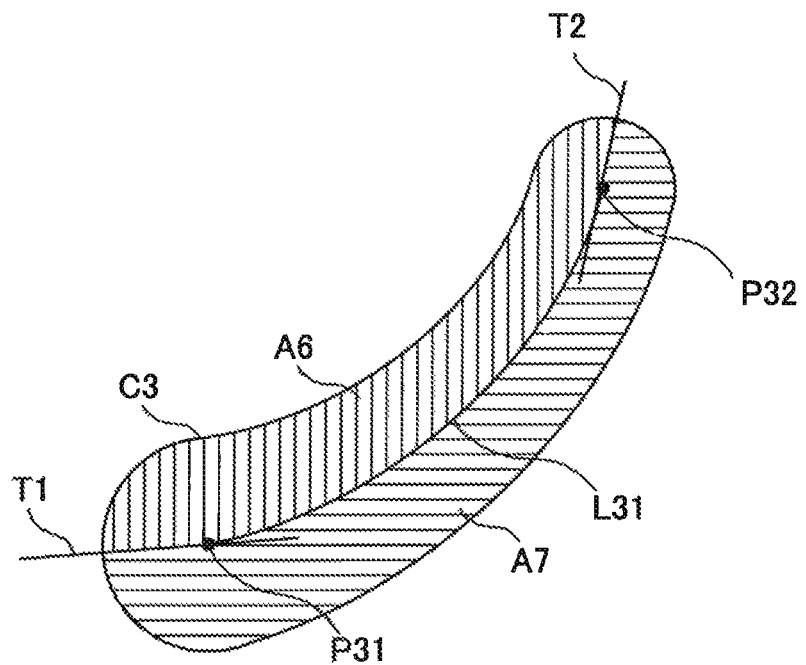
FIG. 22 is a diagram exemplarily illustrating fifth and sixth auxiliary warning regions.

FIG. 22 is a diagram exemplarily illustrating the auxiliary warning region in which the warning line is a curve. In this example, a curve C3 represents a set of coordinates in which a real distance from a warning line L31 is an equal distance. The control unit 211 calculates tangent lines T1 and T2 in edge points P31 and P32 of the warning line L31 and sets, as the auxiliary warning region, a region A6 or A7 surrounded by the warning line L31, the tangent lines T1 and T2, and the curve C3. The tangent lines T1 and T2 referred to here may be translated as a straight line in which a right-hand derivative or a left-hand derivative in the edge P31 or P32 is a slope.

Further, setting processing may be executed by a device different from a device for detection processing and reporting processing. In other words, the intrusion detection system 200 may include an information processing device that executes setting processing and another information processing device that executes detection processing and reporting processing. However, a configuration of any one of the information processing devices may be similar to the configuration of the information processing device 210 of FIG. 13.

The information processing device 210 may detect a plurality of types of objects. The information processing device 210 may execute, for example, detection of a person and detection of an automobile at the same time. However, a person and an automobile are different in average moving velocity. Therefore, when a plurality of types of objects is detected, the information processing device 210 sets $R_{dist}$ in equation (1) to be different depending on a type of each object. The information processing device 210 may store, for example, a table associating a type of an object with $R_{dist}$ on the storage 212 and determine the auxiliary warning region based on the type of the object.

Note that, $R_{dist}$ may be specified by a user. Alternatively, a user may specify the moving velocity of an object and a desired time period, instead of $R_{dist}$. In this case, the control unit 211 can calculate $R_{dist}$ by multiplying a moving velocity by a time period.

It is unnecessary for the intrusion detection system 200 to detect an object from an image in real time. In other words, the image referred to here may be an image previously recorded and stored on a storage and the like. Further, the information processing device 210 may be located in a remote place separated from another device. The information processing device 210 may be realized, for example, using so-called cloud computing technology.

The present invention is not limited to the above-described example embodiments and various modifications can be made without departing from the scope of the invention described in the scope of the claims. It goes without saying that these modifications are included in the scope of the present invention.

(Supplementary Notes)

A part or the whole of the example embodiments of the present invention can be described as, but not limited to, the following supplementary notes.

(Supplementary Note 1)

A intrusion detection device includes:

a detection unit that detects an intrusion position on an image, the intrusion position being where an object intrudes into a specific region on the image; and a control unit that associates—the intrusion position on the image with a predetermined time period, wherein the detection unit outputting an alert when the object stays in the specific region on the image for the predetermined time period or longer, the predetermined time period being associated with the detected intrusion position.

(Supplementary Note 2)

The intrusion detection device according to supplementary note 1, further includes an input unit that accepts an intrusion position and a predetermined time period, wherein the control unit associates the intrusion position and the predetermined time period based on the accepted intrusion position and the accepted predetermined time period.

(Supplementary Note 3)

The intrusion detection device according to supplementary note 1, further includes:

an input unit that accepts an intrusion position, wherein the control unit sets the predetermined time period based on the accepted intrusion position.

(Supplementary Note 4)

The intrusion detection device according to supplementary note 1, further includes an input unit that accepts a predetermined time period, wherein the control unit sets the specific region based on the accepted predetermined time period.

(Supplementary Note 5)

An intrusion detection method includes:

detecting an intrusion position on an image, the intrusion position being where an object intrudes into a specific region on the image;

associating the intrusion position with a predetermined time period; and outputting an alert when the object stays in the specific region on the image for the predetermined time period or longer, the predetermined time period being associated with the detected intrusion position.

(Supplementary Note 6)

A computer-readable program recording medium recording a program for causing a computer to function as:

a detection unit that detects an intrusion position on an image, the intrusion position being where an object intrudes into a specific region on the image; and a control unit that associates the intrusion position on the image with a predetermined time period, wherein the detection unit outputs an alert when the object stays in the specific region on the image for the predetermined time period or longer, the predetermined time period being associated with the detected intrusion position.

(Supplementary Note 7)

A setting assistance device includes:

an acquisition unit that acquires coordinates designated by a user for an image capturing a three-dimensional space;

a calculation unit that calculates coordinates of a position located at a predetermined distance from a position of a part of the three-dimensional space relating to the acquired coordinates; and a determination unit that determines a region set for the acquired coordinates based on the calculated coordinates.

(Supplementary Note 8)

The setting assistance device according to supplementary note 7, wherein the determination unit determines the region based on a direction where an object crosses a position corresponding to the acquired coordinates in the three-dimensional space.

(Supplementary Note 9)

The setting assistance device according to supplementary note 8, wherein the determination unit determines the region being different depending on the direction.

(Supplementary Note 10)

The setting assistance device according to any one of supplementary note 7 to supplementary note 9, wherein the determination unit determines the region by using the acquired coordinates.

(Supplementary Note 11)

The setting assistance device according to any one of supplementary note 7 to supplementary note 10, wherein the determination unit determines the region by using a feature extracted from the image.

(Supplementary Note 12)

The setting assistance device according to any one of supplementary note 7 to supplementary note 11, wherein the determination unit further includes a selection unit that selects any one of a plurality of candidates for the region.

(Supplementary Note 13)

The setting assistance device according to supplementary note 12, further includes a display unit that displays the plurality of candidates together with the image, wherein the selection unit selects any one of the plurality of candidates displayed by the display unit depending on an operation of a user.

(Supplementary Note 14)

The setting assistance device according to any one of supplementary note 7 to supplementary note 13, further includes a detection unit that detects—that an object enters in a part of the three-dimensional space corresponding to the determined region.

(Supplementary Note 15)

A setting assistance method includes:

acquiring coordinates designated by a user for an image capturing a three-dimensional space;

calculating coordinates of a position located at a predetermined distance from a position of a part of the three-dimensional space relating to the acquired coordinates; and determining a region set for the acquired coordinates based on the calculated coordinates.

(Supplementary Note 16)

A computer-readable program recording medium recording a program for causing a computer to execute:

acquiring coordinates designated by a user for an image capturing a three-dimensional space;

calculating coordinates of a position located at a predetermined distance from a position of a part of the three-dimensional space relating to the acquired coordinates; and determining a region set for the acquired coordinates based on the calculated coordinates.

REFERENCE SIGNS LIST

1 Intrusion detection device
2 Detection unit
3 Control unit
4, 5, 6 Input unit

The invention claimed is:

1. A setting assistance device comprising:

at least one processor configured to:

acquire two-dimensional coordinates of a warning line in an image, input by a user, the image capturing a three-dimensional space;

calculate three-dimensional coordinates of a position located at a predetermined distance from the warning line corresponding to the acquired two-dimensional coordinates;

determine, as an auxiliary warning region, a first region of the image set for the acquired two-dimensional coordinates, the auxiliary warning region corresponding to a second region defined by the position represented by the calculated three-dimensional coordinates, the auxiliary warning region being a region to detect a monitoring target approaching a warning region;

control a display to display the determined auxiliary warning region;

detect an object entering the auxiliary warning region of the three-dimensional space from the image; and execute a first reporting processing when the detected object passes the warning line from the auxiliary warning region and execute a second reporting processing when a length of a time period in which the object is in the auxiliary warning region is greater than or equal to a threshold.

2. The setting assistance device according to claim 1, wherein the at least one processor is configured to determine the auxiliary warning region based on a direction where the object crosses the position corresponding to the acquired two-dimensional coordinates in the three-dimensional space.

3. The setting assistance device according to claim 2, wherein the at least one processor is configured to determine the auxiliary warning region based on a moving direction of the object.

4. The setting assistance device according to claim 1, wherein the at least one processor is configured to determine auxiliary warning the region by using the acquired two-dimensional coordinates.

5. The setting assistance device according to claim 1, wherein the at least one processor is configured to determine the auxiliary warning region by using a feature extracted from the image.

6. The setting assistance device according to claim 1, wherein the at least one processor is further configured to select any one of a plurality of candidates for the auxiliary warning region.

7. The setting assistance device according to claim 6, further comprising the display that displays the plurality of candidates together with the image, wherein the at least one processor is configured to select any one of the plurality of candidates displayed by the display based on an operation of the user.

8. The setting assistance device according to claim 1, wherein the at least one processor is further configured to detect an object that enters a part of the three-dimensional space corresponding to the determined auxiliary warning region.

9. A setting assistance method comprising:
by at least one processor,
acquiring two-dimensional coordinates of a warning line in an image, input by a user, the image capturing a three-dimensional space;
calculating three-dimensional coordinates of a position located at a predetermined distance from the warning line corresponding to the acquired two-dimensional coordinates;
determining, as an auxiliary warning region, a first region of the image set for the acquired two-dimensional coordinates, the auxiliary warning region corresponding to a second region defined by the position represented by the calculated three-dimensional coordinates, the auxiliary warning region being a region to detect a monitoring target approaching a warning region;
controlling a display to display the determined auxiliary warning region;
detecting an object entering the auxiliary region of the three-dimensional space from the image; and
executing a first reporting processing when the detected object passes the warning line from the auxiliary warning region and executing a second reporting processing when a length of a time period in which the object is in the auxiliary warning region is greater than or equal to a threshold.

10. A non-transitory computer-readable program recording medium recording a program causing a computer to execute:
acquiring two-dimensional coordinates of a warning line in an image, input by a user, the image capturing a three-dimensional space;
calculating three-dimensional coordinates of a position located at a predetermined distance from the warning line corresponding to the acquired two-dimensional coordinates;
determining, as an auxiliary warning region, a first region of the image set for the acquired two-dimensional coordinates, the auxiliary warning region corresponding to a second region defined by the position represented by the calculated three-dimensional coordinates, the auxiliary warning region being a region to detect a monitoring target approaching a warning region;
controlling a display to display the determined auxiliary warning region;
detecting an object entering the auxiliary warning region of the three-dimensional space from the image; and
executing a first reporting processing when the detected object passes the warning line from the auxiliary warning region and executing a second reporting processing when a length of a time period in which the object is in the auxiliary warning region is greater than or equal to a threshold.

* * * * *